(12) United States Patent
Usami

(10) Patent No.: US 10,279,634 B2
(45) Date of Patent: May 7, 2019

(54) VEHICULAR COMMUNICATION SYSTEM AND IN-VEHICLE COMMUNICATION APPARATUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Akinori Usami, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 15 days.

(21) Appl. No.: 15/556,869

(22) PCT Filed: Mar. 10, 2016

(86) PCT No.: PCT/JP2016/057610
§ 371 (c)(1),
(2) Date: Sep. 8, 2017

(87) PCT Pub. No.: WO2016/148023
PCT Pub. Date: Sep. 22, 2016

(65) Prior Publication Data
US 2018/0050571 A1 Feb. 22, 2018

(30) Foreign Application Priority Data
Mar. 13, 2015 (JP) .................. 2015-051087

(51) Int. Cl.
*H04B 7/00* (2006.01)
*B60C 23/04* (2006.01)
(Continued)

(52) U.S. Cl.
CPC ...... *B60C 23/0483* (2013.01); *B60C 23/0442* (2013.01); *B60C 23/0461* (2013.01);
(Continued)

(58) Field of Classification Search
CPC ............................. H04B 1/3822; H04B 15/00
(Continued)

(56) References Cited

U.S. PATENT DOCUMENTS 6,389,337 B1 * 5/2002 Kolls ...................... B60R 25/04
340/439
9,326,092 B2 * 4/2016 Nelson .................... H04W 4/90
(Continued)

FOREIGN PATENT DOCUMENTS

JP  2004-189072 A  7/2004
JP  2005-157511 A  6/2005
(Continued)

OTHER PUBLICATIONS

Search Report for PCT/JP2016/057610, dated May 24, 2016.

*Primary Examiner* — April G Gonzales
(74) *Attorney, Agent, or Firm* — Honigman LLP

(57) ABSTRACT

Provided is a vehicular communication system configured to prevent crosstalk between signals transmitted from an in-vehicle wireless device constituting one wireless communication system such as a TPMS and a mobile device constituting another wireless communication system. The vehicular communication system includes a mobile device wirelessly transmitting a signal related to operation of a vehicle, an in-vehicle wireless device wirelessly transmitting a signal related to the vehicle, and an in-vehicle communication apparatus provided in a different part from the in-vehicle wireless device and wirelessly communicates with the mobile device and the in-vehicle wireless device. The in-vehicle communication apparatus receives signals
(Continued)

transmitted from the mobile device and the in-vehicle communication apparatus, and determines whether there is crosstalk. The in-vehicle communication apparatus transmits to the mobile device or the in-vehicle wireless device, a stop signal instructing to stop signal transmission when crosstalk has occurred.

9 Claims, 19 Drawing Sheets

(51) Int. Cl.
  *H04B 1/3822* (2015.01)
  *H04B 15/00* (2006.01)
  *B60R 16/023* (2006.01)
  *H04B 15/04* (2006.01)
(52) U.S. Cl.
  CPC ........ *B60C 23/0464* (2013.01); *B60R 16/023* (2013.01); *H04B 1/3822* (2013.01); *H04B 15/00* (2013.01); *H04B 15/04* (2013.01)
(58) Field of Classification Search
  USPC ....................................................... 455/63.1
  See application file for complete search history.

(56) References Cited

U.S. PATENT DOCUMENTS

| | | | | |
|---|---|---|---|---|
| 2004/0113765 A1* | 6/2004 | Suitsu | ................ | B60C 23/0408 340/445 |
| 2006/0211368 A1* | 9/2006 | Wisnia | ................ | B60R 25/04 455/3.06 |
| 2006/0270465 A1* | 11/2006 | Lee | ................ | H04M 1/7253 455/569.1 |
| 2007/0200688 A1* | 8/2007 | Tang | ................ | B60R 25/04 340/426.18 |
| 2009/0102636 A1* | 4/2009 | Tranchina | ................ | B60C 23/0408 340/447 |
| 2009/0265046 A1* | 10/2009 | Sekiyama | ................ | B60R 25/04 701/1 |
| 2010/0305779 A1* | 12/2010 | Hassan | ................ | G01C 17/38 701/2 |
| 2011/0254660 A1* | 10/2011 | Sun | ................ | B60C 23/0418 340/5.61 |
| 2011/0319127 A1* | 12/2011 | Yamamoto | ................ | H04W 52/383 455/522 |
| 2013/0181824 A1* | 7/2013 | Kimura | ................ | G07C 9/00182 340/438 |
| 2014/0277937 A1* | 9/2014 | Scholz | ................ | G06F 7/00 701/36 |
| 2015/0023201 A1* | 1/2015 | Yanagidate | ................ | H01Q 3/30 370/252 |
| 2015/0141043 A1* | 5/2015 | Abramson | ................ | G01C 21/34 455/456.1 |
| 2015/0168174 A1* | 6/2015 | Abramson | ................ | G01C 21/3697 701/408 |
| 2015/0338229 A1* | 11/2015 | Yuan | ................ | G06Q 30/0641 701/539 |
| 2015/0341440 A1* | 11/2015 | Nelson | ................ | H04L 67/125 455/41.2 |
| 2015/0341766 A1* | 11/2015 | Nelson | ................ | H04W 4/025 455/404.2 |
| 2015/0341767 A1* | 11/2015 | Nelson | ................ | G08B 25/016 455/404.2 |
| 2016/0134383 A1* | 5/2016 | Banasky, Jr. | ................ | H04B 1/40 455/67.14 |

FOREIGN PATENT DOCUMENTS

| | | |
|---|---|---|
| JP | 2008-099085 A | 4/2008 |
| JP | 2011-079461 A | 4/2011 |
| JP | 2013-026732 A | 2/2013 |
| JP | 2013-236300 A | 11/2013 |

\* cited by examiner

[FIG. 1]
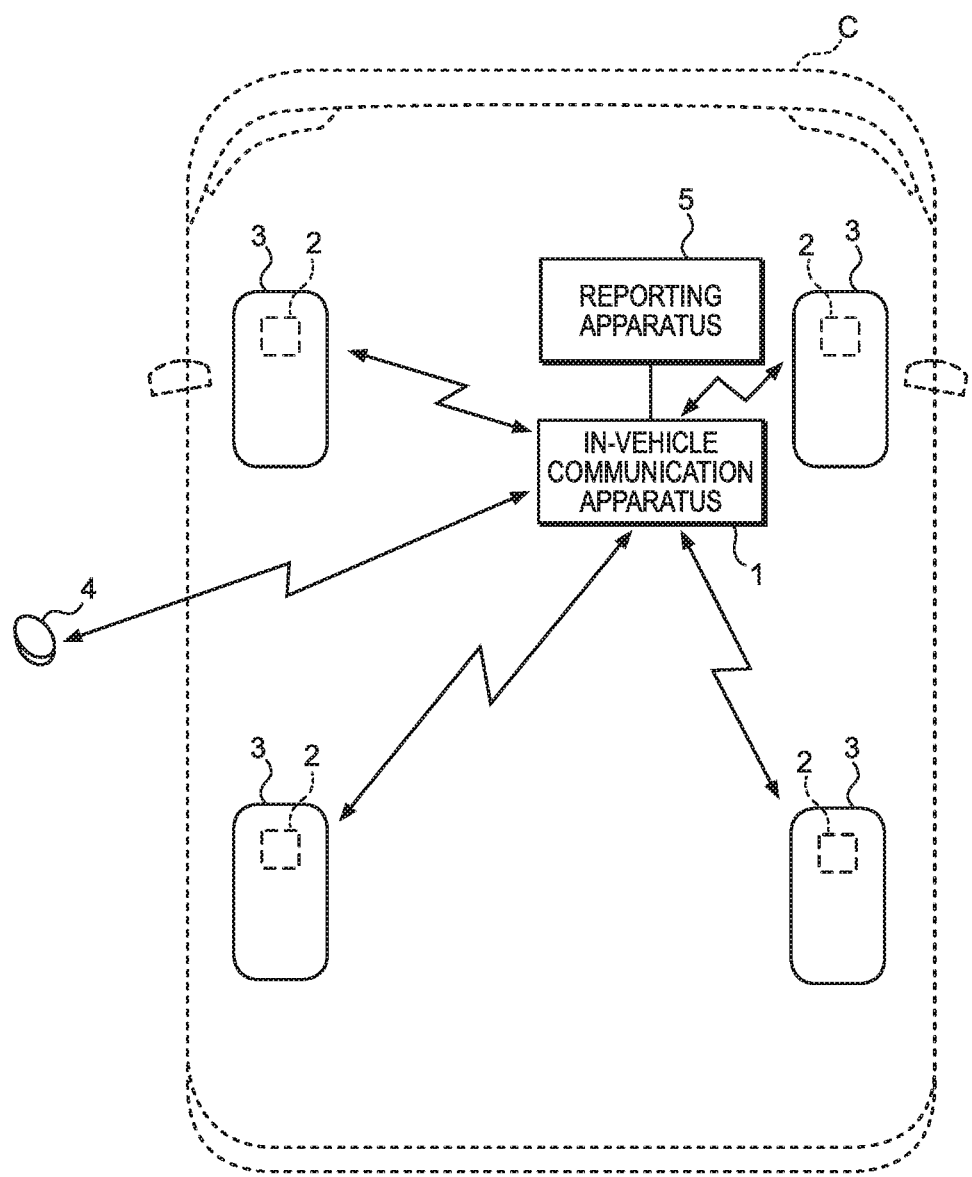

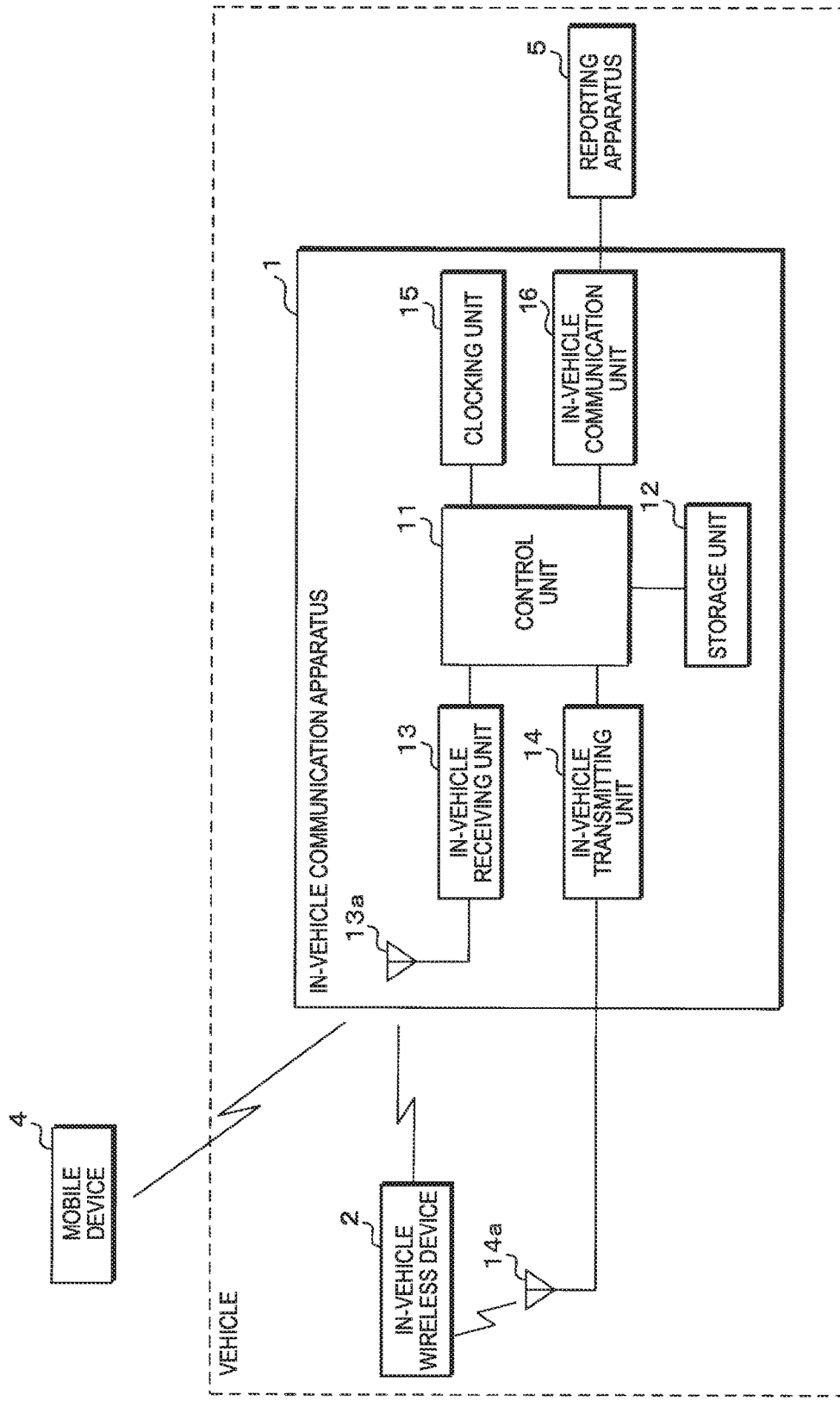
[FIG. 2]

[FIG. 3]
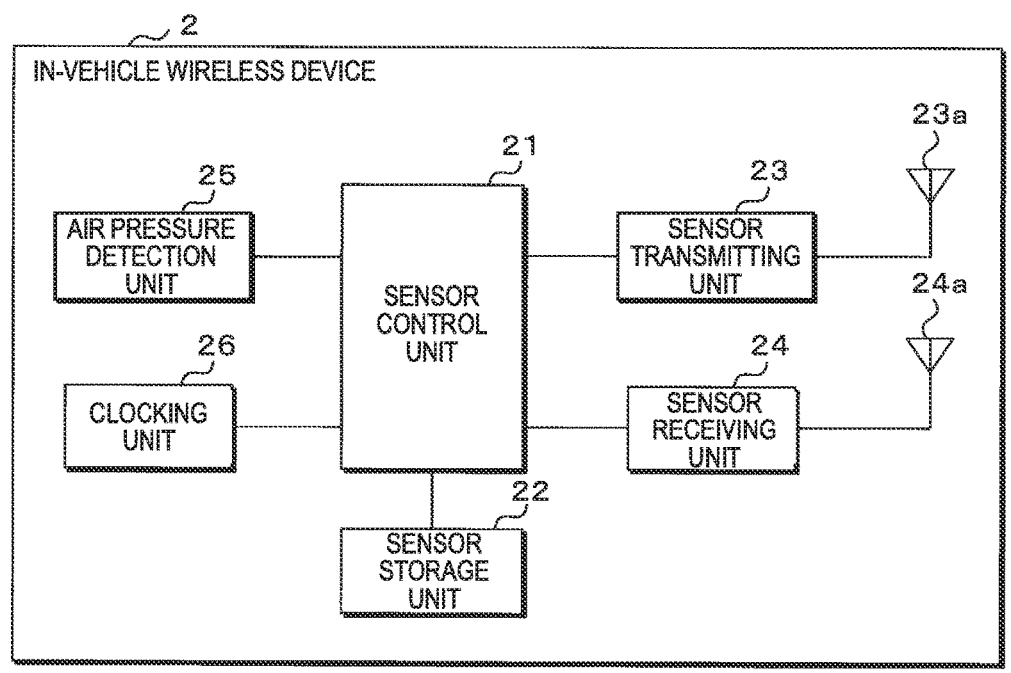

[FIG. 4]
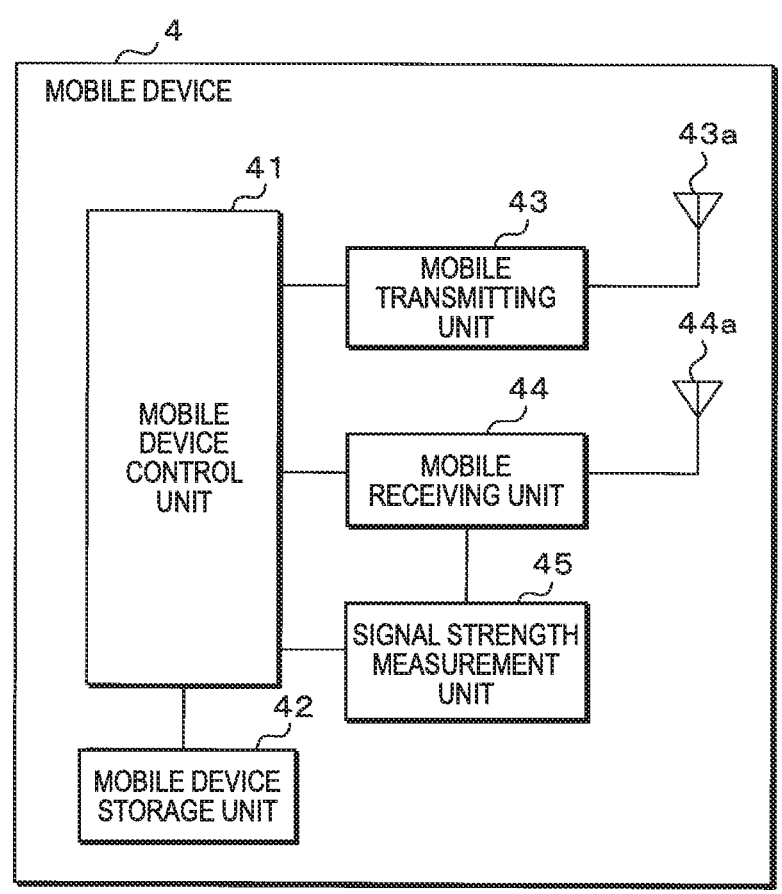

[FIG. 5]
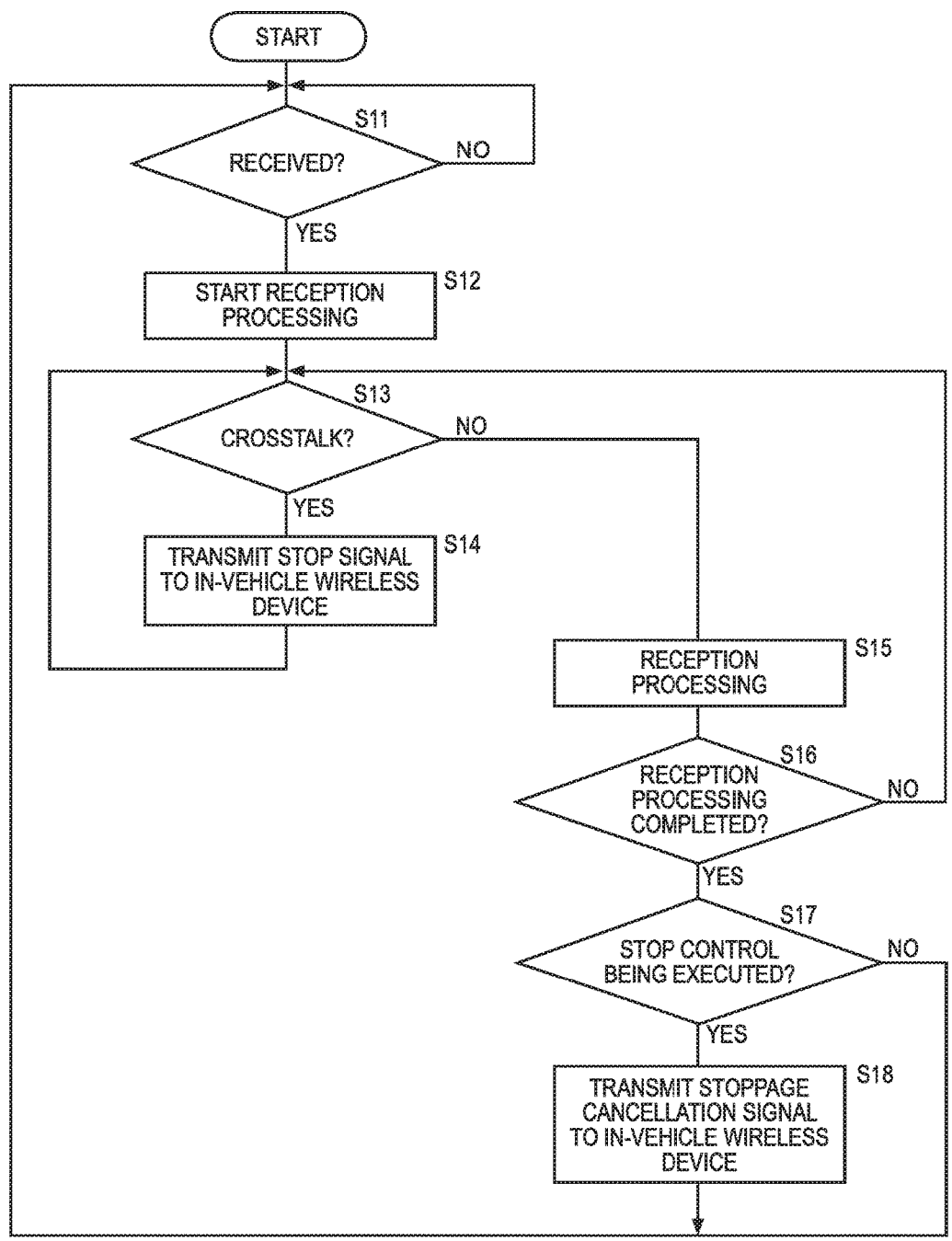

[FIG. 6]
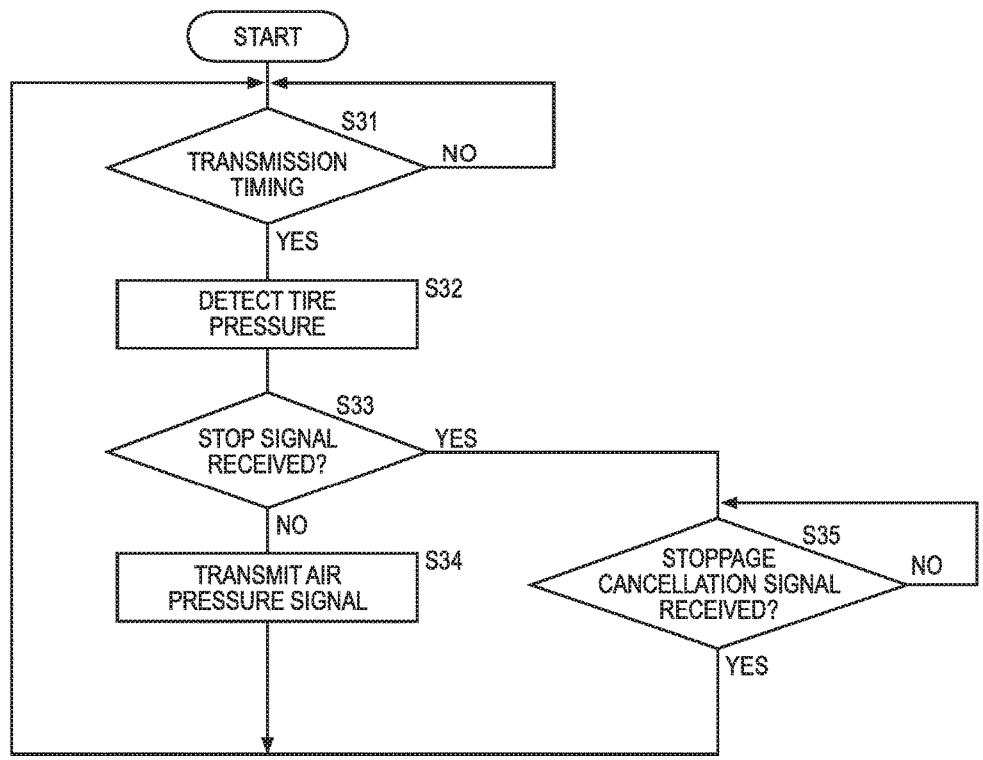

[FIG. 7]
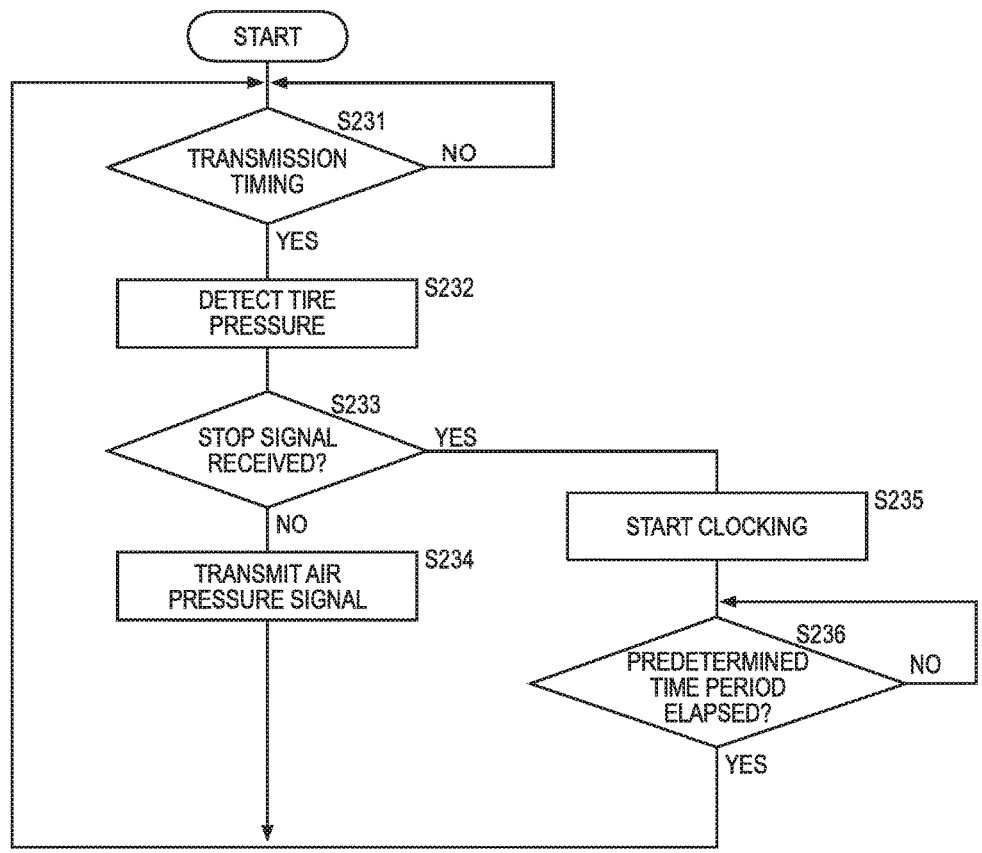

[FIG. 8]
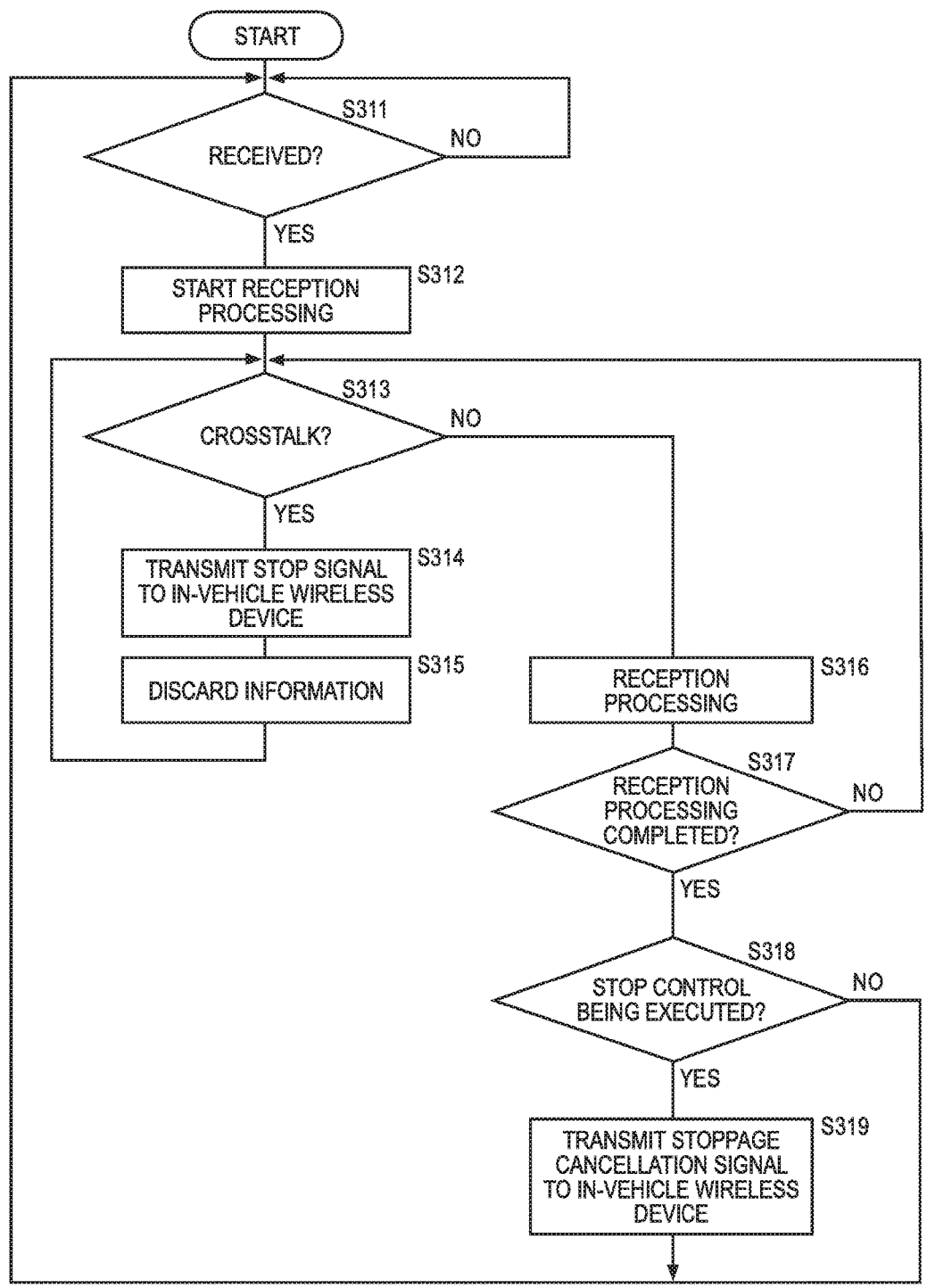

[FIG. 9]
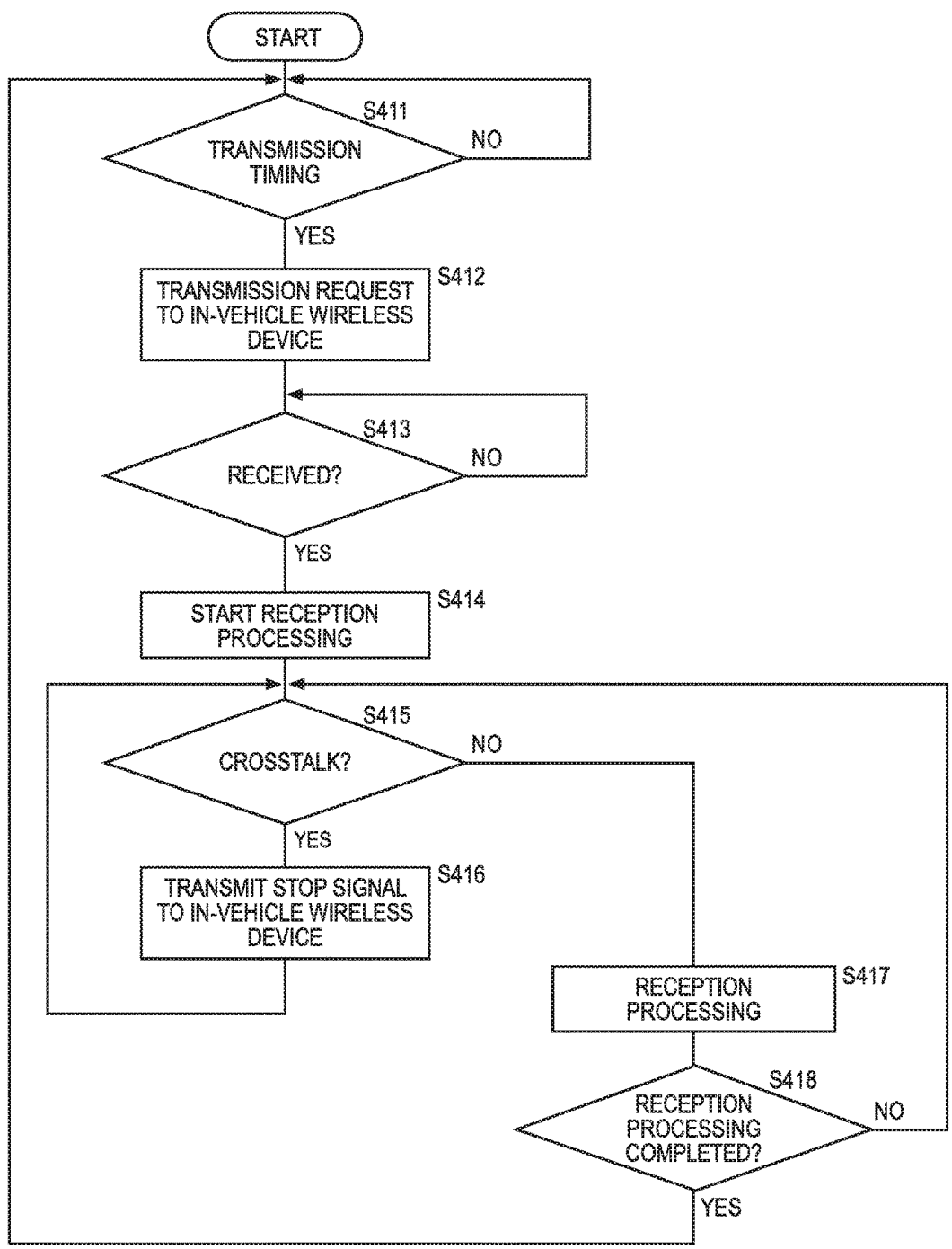

[FIG. 10]
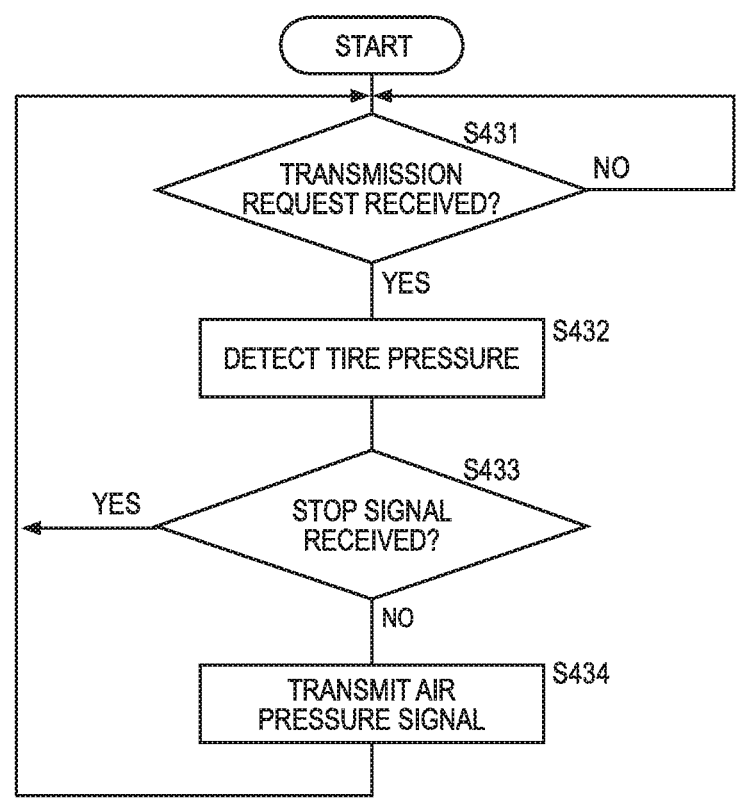

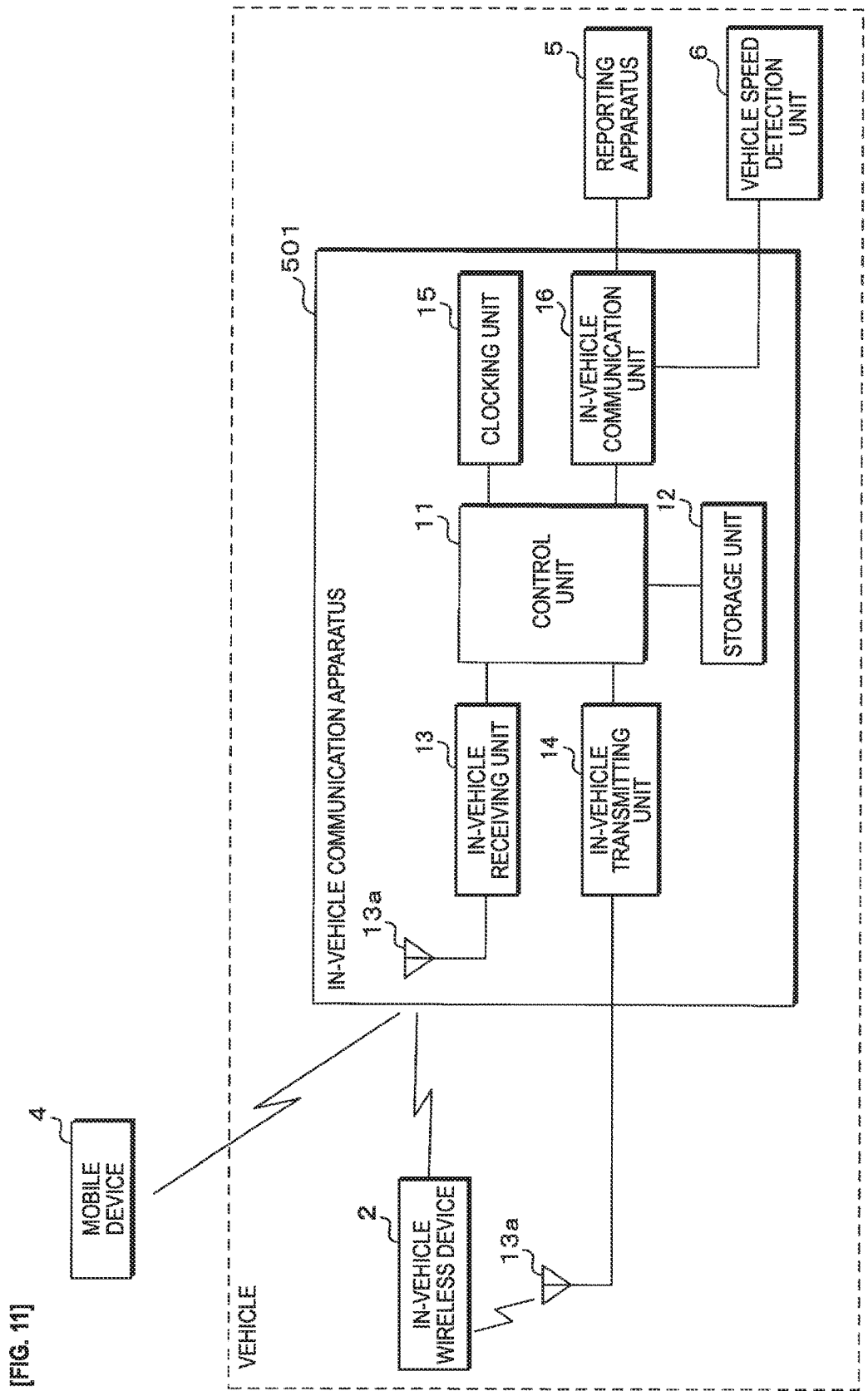

[FIG. 12]
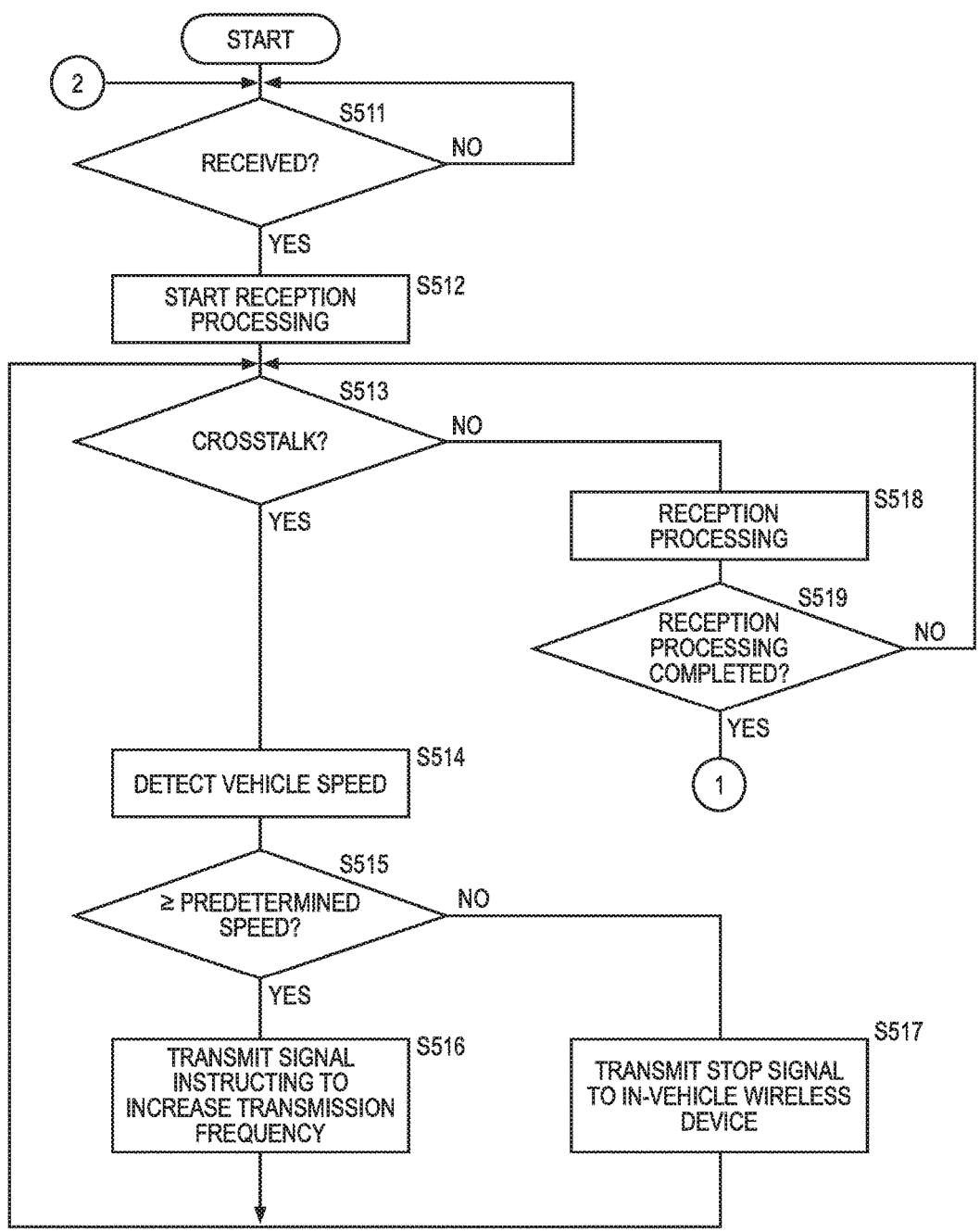

[FIG. 13]
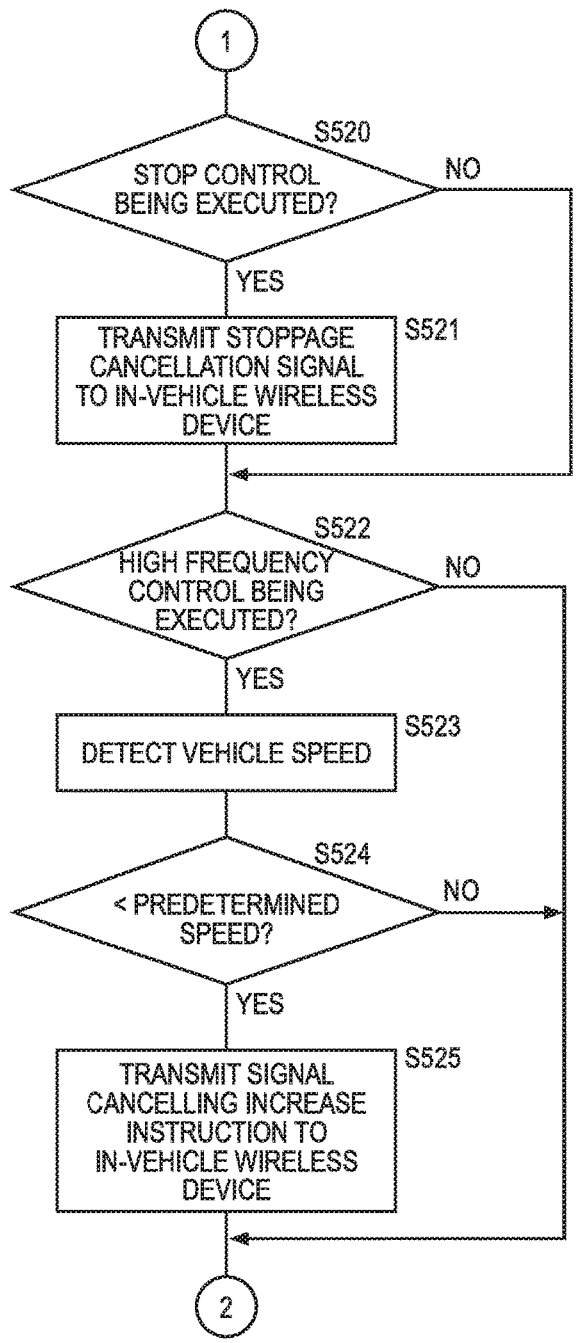

[FIG. 14]
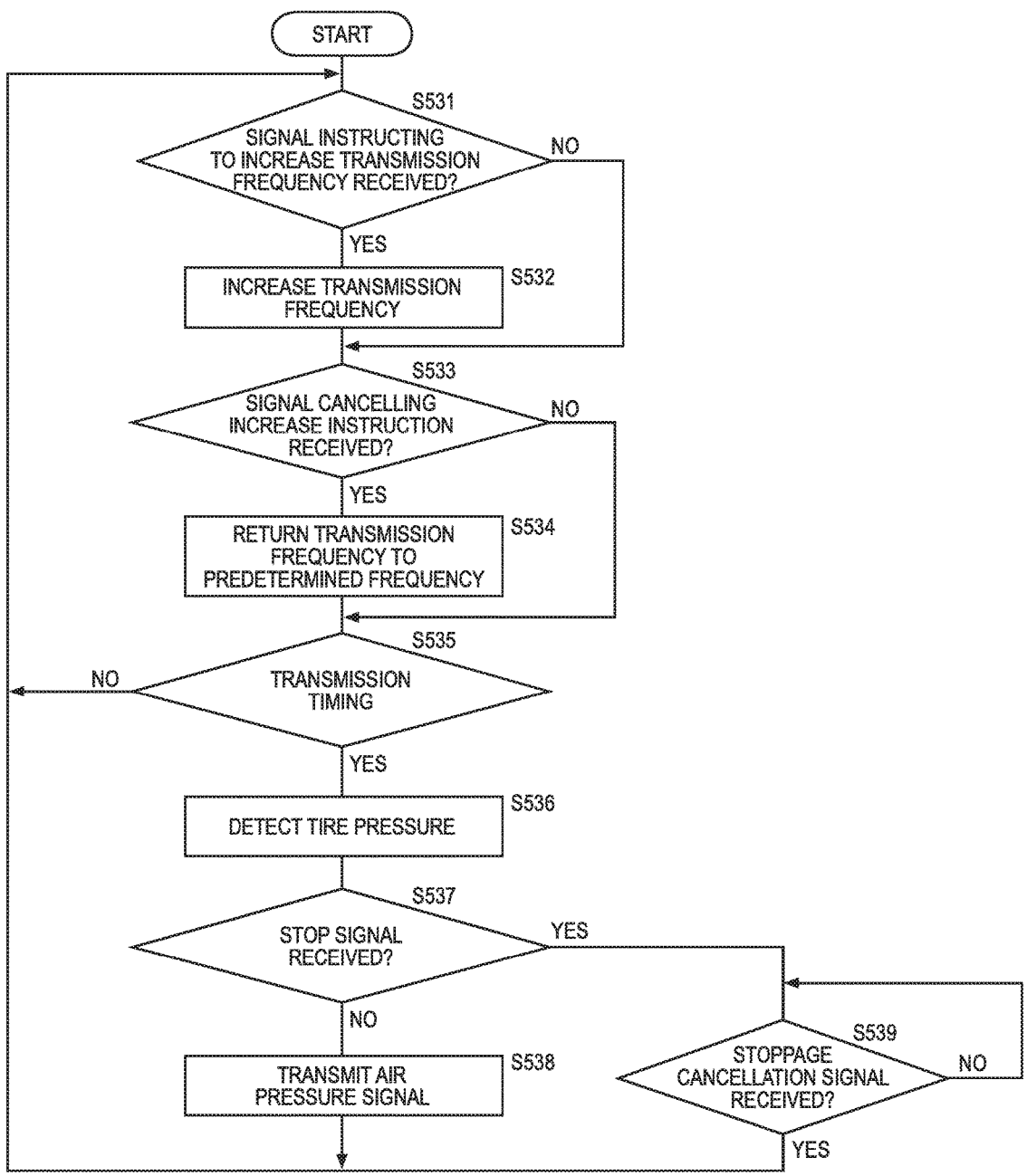

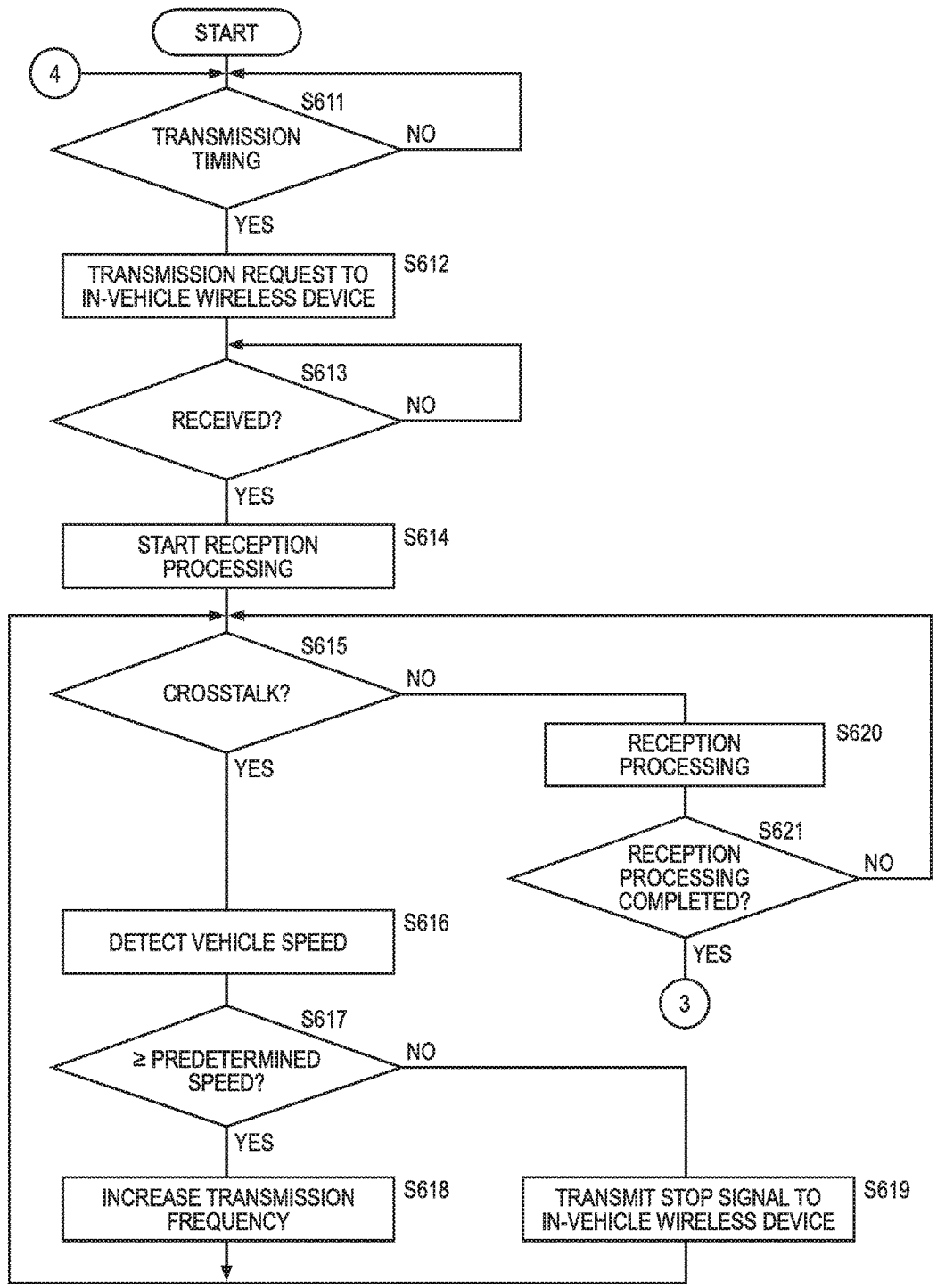

[FIG. 16]
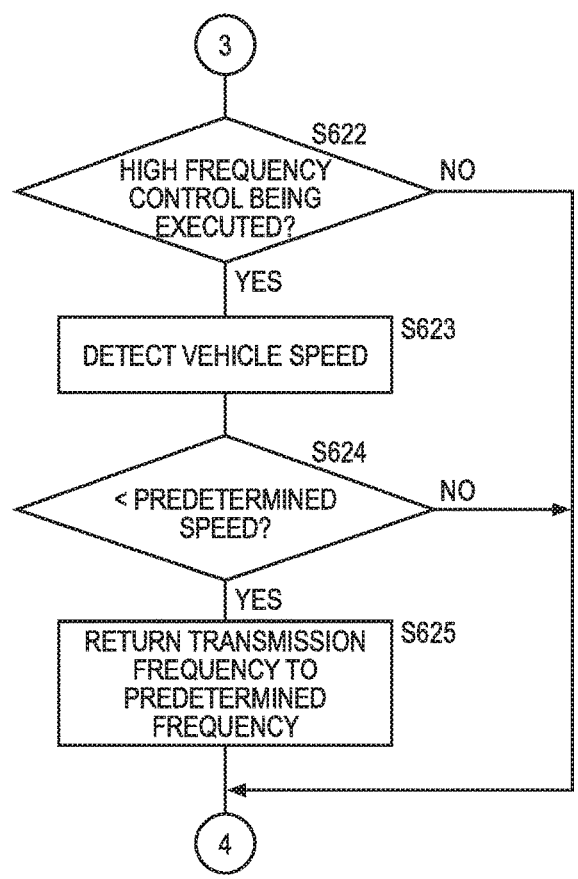

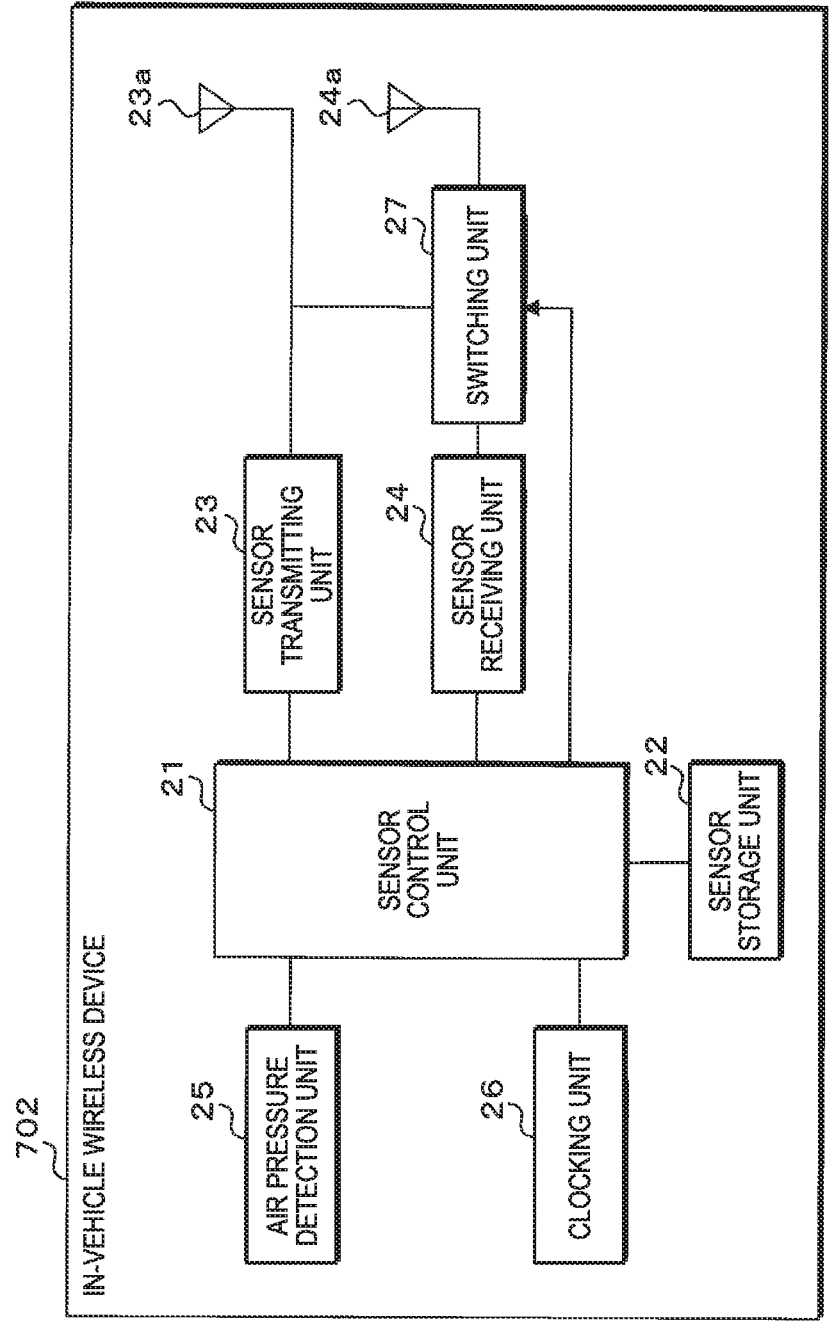
[FIG. 17]

[FIG. 18]
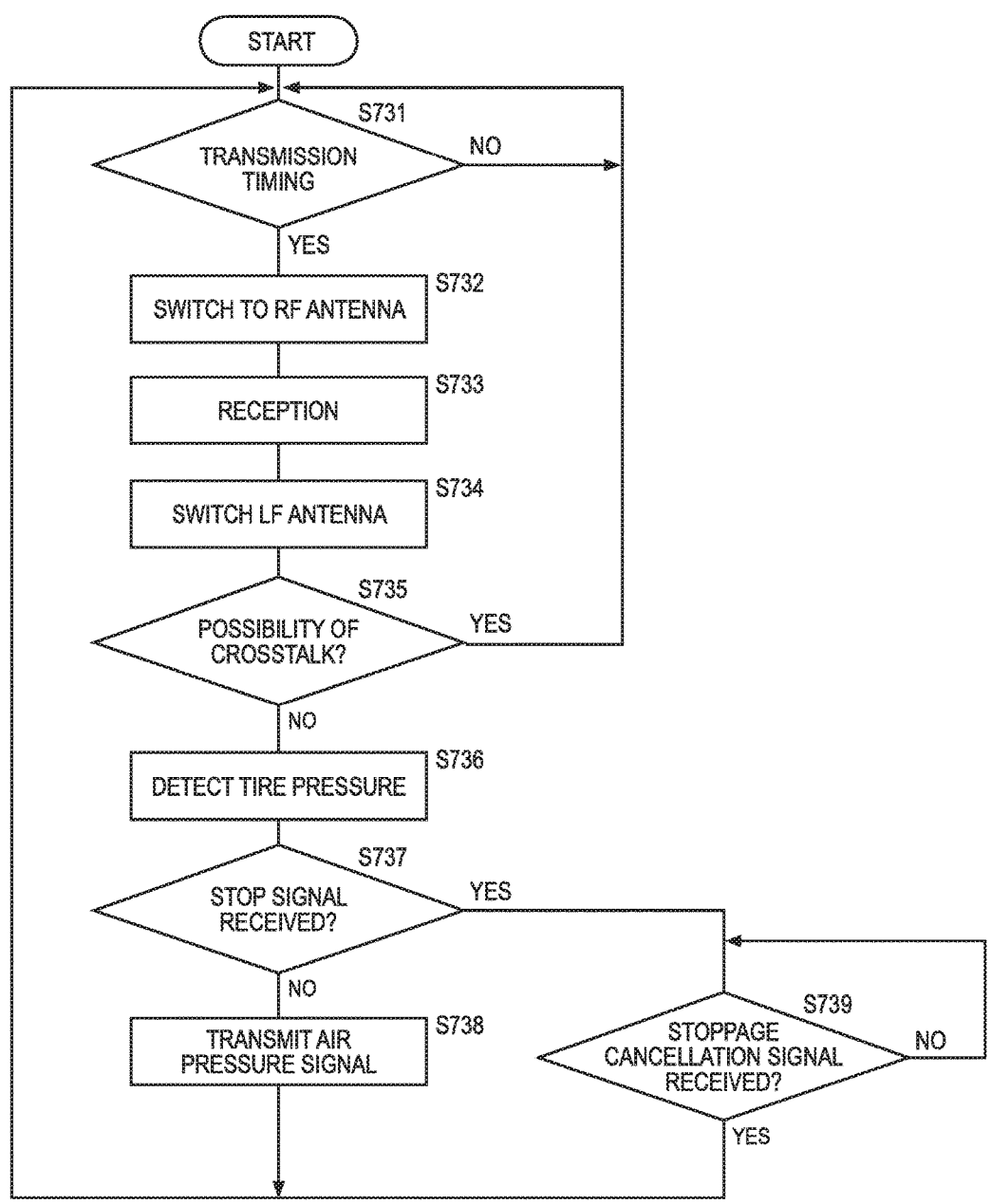

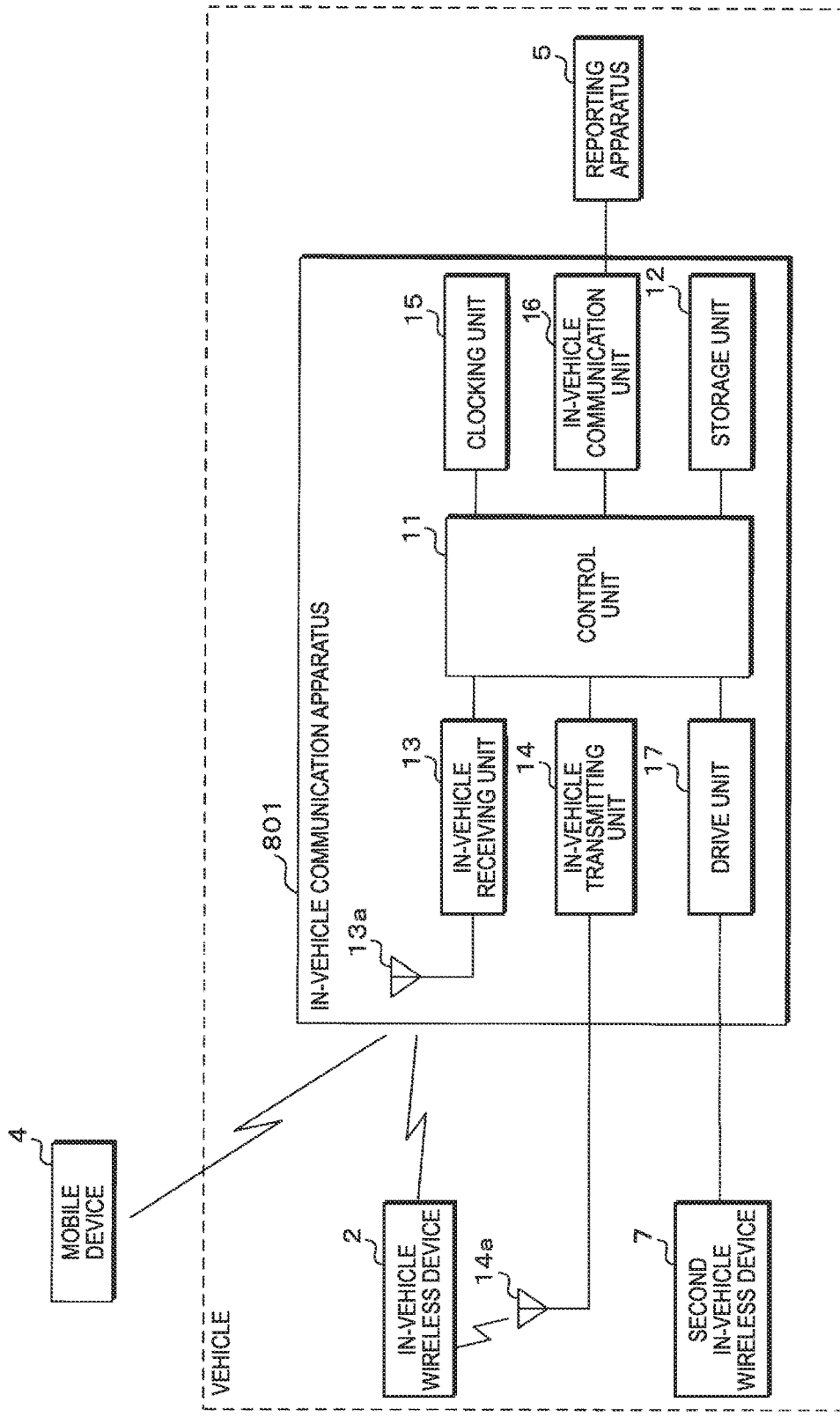
[FIG. 19]

VEHICULAR COMMUNICATION SYSTEM AND IN-VEHICLE COMMUNICATION APPARATUS

CROSS-REFERENCE TO RELATED APPLICATIONS

This application is the U.S. national stage of PCT/JP2016/057610 filed Mar. 10, 2016, which claims priority of Japanese Patent Application No. JP 2015-051087 filed Mar. 13, 2015.

TECHNICAL FIELD

The present invention relates to a vehicular communication system provided with a mobile device and an in-vehicle wireless device that wirelessly transmit signals using radio waves in the same frequency band and an in-vehicle communication apparatus that receives the signals, and to the in-vehicle communication apparatus constituting the vehicular communication system.

BACKGROUND

A TPMS (Tire Pressure Monitoring System) functions to detect the air pressure of tires attached to a vehicle, and to issue a warning or the like to a user in the case where the detected air pressure is abnormal. The TPMS includes an in-vehicle wireless device that detects the air pressure of a tire and wirelessly transmits a signal indicating the detected air pressure using radio waves in the UHF band, an in-vehicle communication apparatus that is provided in the vehicle and receives the signal wirelessly transmitted from the in-vehicle wireless device, and a reporting apparatus that reports the air pressure that is indicated by the received signal.

However, the frequency band of the signal that is transmitted by the in-vehicle wireless device of the TPMS is the same as the frequency band of the signal that is transmitted by a mobile device, that is, an electronic key, constituting a passive entry system, a keyless entry system, a smart start system or the like, possibly resulting in crosstalk. Crosstalk may cause a malfunction of a passive entry system or the like. Crosstalk may also cause a malfunction of a tire pressure monitoring system.

An object of the present invention is to provide a vehicular communication system and an in-vehicle communication apparatus that are able to prevent crosstalk between signals that are transmitted from an in-vehicle wireless device constituting one wireless communication system such as a TPMS and a mobile device constituting another wireless communication system.

SUMMARY

A vehicular communication system according to one aspect of the present invention is a vehicular communication system including a mobile device configured to wirelessly transmit a signal related to operation of a vehicle in a predetermined frequency band, an in-vehicle wireless device configured to wirelessly transmit a signal related to the vehicle in the predetermined frequency band, and an in-vehicle communication apparatus provided in a different part from the in-vehicle wireless device and configured to wirelessly communicate with the mobile device and the in-vehicle wireless device, the in-vehicle communication apparatus including an in-vehicle receiving unit configured to receive the signals transmitted from the mobile device and the in-vehicle wireless device, a determination unit configured to determine whether there is crosstalk, based on the signals received with the in-vehicle receiving unit, and an in-vehicle transmitting unit configured to transmit, to the mobile device or the in-vehicle wireless device, a stop signal instructing to stop signal transmission, in a case where it is determined with the determination unit that crosstalk has occurred, and the mobile device or the in-vehicle wireless device stopping signal transmission, in a case where the stop signal is received.

An in-vehicle communication apparatus according to one aspect of the present invention is an in-vehicle communication apparatus that communicates with a mobile device configured to wirelessly transmit a signal related to operation of a vehicle in a predetermined frequency band and an in-vehicle wireless device configured to wirelessly transmit a signal related to the vehicle in the predetermined frequency band, the in-vehicle communication apparatus including an in-vehicle receiving unit configured to receive the signals in the predetermined frequency band, a determination unit configured to determine whether there is crosstalk, based on the signals received with the in-vehicle receiving unit, and an in-vehicle transmitting unit configured to transmit, to the mobile device or the in-vehicle wireless device, a stop signal instructing to stop signal transmission, in a case where it is determined with the determination unit that crosstalk has occurred.

Note that the instant invention can be realized not only as a vehicular communication system and an in-vehicle communication apparatus that include such characteristic processing units, but also as a vehicular communication method provided with such characteristic processing as steps or as a program for causing a computer to execute such steps. Also, the instant invention can be realized as a semiconductor integrated circuit that realizes part or all of the vehicular communication system and the in-vehicle communication apparatus, or as another system including the vehicular communication system and the in-vehicle communication apparatus.

Advantageous Effects of Invention

According to the above, it becomes possible to provide a vehicular communication system and an in-vehicle communication apparatus that are able to prevent crosstalk between signals that are transmitted from an in-vehicle wireless device constituting one wireless communication system such as a TPMS and a mobile device constituting another wireless communication system.

BRIEF DESCRIPTION OF DRAWINGS

FIG. 1 is a schematic diagram showing one exemplary configuration of a vehicular communication system according to a first embodiment of the present invention.

FIG. 2 is a block diagram showing one exemplary configuration of an in-vehicle communication apparatus.

FIG. 3 is a block diagram showing one exemplary configuration of an in-vehicle wireless device.

FIG. 4 is a block diagram showing one exemplary configuration of a mobile device.

FIG. 5 is a flowchart showing a processing procedure of the in-vehicle communication apparatus according to the first embodiment.

FIG. 6 is a flowchart showing a processing procedure of the in-vehicle wireless device according to the first embodiment.

FIG. 7 is a flowchart showing a processing procedure of an in-vehicle wireless device according to a second embodiment.

FIG. 8 is a flowchart showing a processing procedure of an in-vehicle communication apparatus according to a third embodiment.

FIG. 9 is a flowchart showing a processing procedure of an in-vehicle communication apparatus according to a fourth embodiment.

FIG. 10 is a flowchart showing a processing procedure of an in-vehicle wireless device according to the fourth embodiment.

FIG. 11 is a block diagram showing one exemplary configuration of an in-vehicle communication apparatus according to a fifth embodiment.

FIG. 12 is a flowchart showing a processing procedure of the in-vehicle communication apparatus according to the fifth embodiment.

FIG. 13 is a flowchart showing a processing procedure of the in-vehicle communication apparatus according to the fifth embodiment.

FIG. 14 is a flowchart showing a processing procedure of an in-vehicle wireless device according to the fifth embodiment.

FIG. 15 is a flowchart showing a processing procedure of an in-vehicle communication apparatus according to a sixth embodiment.

FIG. 16 is a flowchart showing a processing procedure of the in-vehicle communication apparatus according to the sixth embodiment.

FIG. 17 is a block diagram showing one exemplary configuration of an in-vehicle wireless device according to a seventh embodiment.

FIG. 18 is a flowchart showing a processing procedure of the in-vehicle wireless device according to the seventh embodiment.

FIG. 19 is a block diagram showing one exemplary configuration of an in-vehicle communication apparatus according to an eighth embodiment.

DETAILED DESCRIPTION OF PREFERRED EMBODIMENTS

Embodiments of the present invention will firstly be described in enumerated form. Also, the embodiments that are described below may be suitably combined at least in part.

(1) A vehicular communication system according to one aspect of the present invention is a vehicular communication system including a mobile device configured to wirelessly transmit a signal related to operation of a vehicle in a predetermined frequency band, an in-vehicle wireless device configured to wirelessly transmit a signal related to the vehicle in the predetermined frequency band, and an in-vehicle communication apparatus provided in a different part from the in-vehicle wireless device and configured to wirelessly communicate with the mobile device and the in-vehicle wireless device, the in-vehicle communication apparatus including an in-vehicle receiving unit configured to receive the signals transmitted from the mobile device and the in-vehicle wireless device, a determination unit configured to determine whether there is crosstalk, based on the signals received with the in-vehicle receiving unit, and an in-vehicle transmitting unit configured to transmit, to the mobile device or the in-vehicle wireless device, a stop signal instructing to stop signal transmission, in a case where it is determined with the determination unit that crosstalk has occurred, and the mobile device or the in-vehicle wireless device stopping signal transmission, in a case where the stop signal is received.

In the instant invention, the in-vehicle communication apparatus is able to receive a signal wirelessly transmitted from the mobile device, and constitutes one communication system. Also, the in-vehicle communication apparatus is able to receive a signal wirelessly transmitted from the in-vehicle wireless device, and constitutes another communication system. In the case where signals are wirelessly transmitted at the same time from the mobile device and the in-vehicle wireless device, crosstalk occurs since the frequency band of the signals is the same.

The determination unit of the in-vehicle communication apparatus determines whether there is crosstalk, based on the signals received with the in-vehicle receiving unit. In the case where it is determined that there is crosstalk, the in-vehicle transmitting unit of the in-vehicle communication apparatus transmits a stop signal to the in-vehicle wireless device. The in-vehicle wireless device, having received the stop signal, stops signal transmission. Accordingly, thereafter, crosstalk does not occur, and the in-vehicle communication apparatus is able to receive the signal that is transmitted from the mobile device.

Similarly, the in-vehicle transmitting unit of the in-vehicle communication apparatus may be configured to transmit a stop signal to the mobile device. The mobile device, having received the stop signal, stops signal transmission. Accordingly, thereafter, crosstalk does not occur, and the in-vehicle communication apparatus is able to receive the signal that is transmitted from the in-vehicle wireless device.

(2) A configuration is preferably adopted in which the in-vehicle transmitting unit transmits, to the mobile device or the in-vehicle wireless device, a stoppage cancellation signal instructing to cancel transmission stoppage, and the mobile device or the in-vehicle wireless device resumes signal transmission, in a case where the stoppage cancellation signal is received.

In the instant invention, in the case where the stop signal is transmitted to the in-vehicle wireless device, the in-vehicle wireless device stops signal transmission. The in-vehicle communication apparatus is able to resume transmission of the signal by the in-vehicle wireless device, by transmitting a cancellation signal to the in-vehicle wireless device.

Accordingly, the in-vehicle communication apparatus is able to receive the signal from the mobile device by transmitting the stop signal to stop transmission of the signal from the in-vehicle wireless device. Thereafter, the in-vehicle communication apparatus is able to receive the signal from the in-vehicle wireless device by transmitting the cancellation signal to resume transmission of the signal from the in-vehicle wireless device.

Similarly, in the case where the stop signal is transmitted to the mobile device, the mobile device stops signal transmission. The in-vehicle communication apparatus is able to resume transmission of the signal by the mobile device by transmitting the cancellation signal to the mobile device.

Accordingly, the in-vehicle communication apparatus is able to receive the signal from the in-vehicle wireless device by transmitting the stop signal to stop transmission of the signal from the mobile device. Thereafter, the in-vehicle communication apparatus is able to receive the signal from the mobile device by transmitting the cancellation signal to resume transmission of the signal from the mobile device.

(3) A configuration is preferably adopted in which the mobile device or the in-vehicle wireless device includes a clocking unit configured to clock an elapsed time period from when the stop signal was received, and resumes signal transmission in a case where a predetermined time period elapses from when the stop signal was received.

In the instant invention, in the case where the stop signal is transmitted to the in-vehicle wireless device, the in-vehicle wireless device stops signal transmission for a predetermined time period, and, after the predetermined time period has elapsed, resumes signal transmission. Accordingly, the in-vehicle communication apparatus is able to receive the signal from the mobile device during the predetermined time period, and to receive the signal from the in-vehicle wireless device after the predetermined time period has elapsed.

Similarly, a configuration can be adopted in which, in the case where the stop signal is transmitted to the mobile device, the mobile device stops signal transmission for the predetermined time period, and resumes signal transmission after the predetermined time period has elapsed. Accordingly, the in-vehicle communication apparatus is able to receive the signal from the in-vehicle wireless device during the predetermined time period, and to receive the signal from the mobile device after the predetermined time period has elapsed.

(4) A configuration is preferably adopted in which the in-vehicle communication apparatus deletes information of the signal received with the in-vehicle receiving unit, in a case where it is determined with the determination unit that crosstalk has occurred.

In the instant invention, the in-vehicle communication apparatus, in the case where crosstalk occurs, deletes the information of the signal received by the in-vehicle receiving unit at that time. Accordingly, reception of erroneous information due to crosstalk can be prevented.

(5) A configuration is preferably adopted in which the in-vehicle transmitting unit transmits the stop signal to the in-vehicle wireless device before the signal is transmitted from the in-vehicle wireless device, in a case where the in-vehicle receiving unit receives the signal transmitted from the mobile device after transmitting, to the in-vehicle wireless device, a request signal requesting signal transmission.

In the instant invention, a request signal requesting signal transmission is transmitted to the in-vehicle wireless device, and the in-vehicle wireless device transmits a signal in response to the request signal.

The in-vehicle communication apparatus, in the case where the in-vehicle receiving unit receives the signal transmitted from the mobile device after transmission of the request signal, transmits the stop signal to the in-vehicle wireless device before the signal is transmitted from the in-vehicle wireless device in response to the request signal. In other words, the in-vehicle communication apparatus, despite having requested signal transmission from the in-vehicle wireless device, stops transmission of the signal from the in-vehicle wireless device by immediately transmitting the stop signal to the in-vehicle wireless device, in the case where there is a risk that crosstalk may occur due to the signal from the mobile device. The in-vehicle communication apparatus is then able to receive the signal from the mobile device in a state where crosstalk will not occur.

(6) A configuration is preferably adopted in which the vehicular communication system includes an air pressure detection unit configured to detect an air pressure of a tire of the vehicle, and the in-vehicle wireless device transmits a signal related to the air pressure detected with the air pressure detection unit.

In the instant invention, the in-vehicle wireless device transmits a signal related to the air pressure of a tire to the in-vehicle communication apparatus. The in-vehicle communication apparatus is able to prevent crosstalk and obtain information related to the air pressure of the tire.

(7) A configuration is preferably adopted in which the vehicular communication system includes a vehicle speed detection unit configured to detect a speed of the vehicle, and the in-vehicle transmitting unit intermittently transmits, to the in-vehicle wireless device, a request signal requesting signal transmission, and, in a case where the speed detected with the vehicle speed detection unit is greater than or equal to a predetermined speed and it is determined with the determination unit that crosstalk has occurred, increases a transmission frequency of the request signal.

In the instant invention, the in-vehicle transmitting unit of the in-vehicle communication apparatus intermittently transmits the request signal to the in-vehicle wireless device, and the in-vehicle wireless device transmits the signal related to the air pressure of the tire to the in-vehicle communication apparatus whenever the request signal is received. The in-vehicle transmitting unit of the in-vehicle communication apparatus increases the transmission frequency of the request signal, in the case where the speed of the vehicle is greater than or equal to a predetermined speed and crosstalk has occurred.

In the case where the speed of the vehicle is greater than or equal to a predetermined speed, the signal related to the air pressure of the tire will be more important than the signal that is transmitted from the mobile device. Accordingly, the in-vehicle communication apparatus, in the case where crosstalk occurs when the speed of the vehicle is greater than or equal to the predetermined speed, is able to increase the reception success probability of the more important signal, by causing the signal related to the air pressure of the tire to be transmitted at a higher frequency.

(8) A configuration is preferably adopted in which the vehicular communication system includes a vehicle speed detection unit configured to detect a speed of the vehicle, the in-vehicle transmitting unit transmits a predetermined instruction signal to the in-vehicle wireless device, in a case where the speed detected with the vehicle speed detection unit is greater than or equal to a predetermined speed and it is determined with the determination unit that crosstalk has occurred, and the in-vehicle wireless device intermittently transmits the signal related to the vehicle, and, in a case where the in-vehicle receiving unit receives the instruction signal, increases the transmission frequency of the signal related to the vehicle.

In the instant invention, the in-vehicle wireless device intermittently transmits the signal related to the air pressure of the tire to the in-vehicle communication apparatus. The in-vehicle transmitting unit of the in-vehicle communication apparatus transmits a predetermined instruction signal to the in-vehicle wireless device, in the case where crosstalk occurs when the speed of the vehicle is greater than or equal to a predetermined speed. The in-vehicle wireless device increases the transmission frequency of the signal related to the air pressure of the tire, in the case where the instruction signal is received.

Accordingly, the in-vehicle communication apparatus is able to increase the reception success probability of the more important signal, by causing the signal related to the air pressure of the tire to be transmitted at a higher frequency, in the case where crosstalk occurs when the speed of the vehicle is greater than or equal to the predetermined speed.

(9) A configuration is preferably adopted in which the in-vehicle wireless device includes a monitoring unit configured to monitor whether there is a signal in the predetermined frequency band that is transmitted from outside, and, in a case where there is not a signal in the predetermined frequency band, transmits the signal related to the vehicle, and, in a case where there is a signal in the predetermined frequency band, stops transmission of the signal related to the vehicle.

In the instant invention, the in-vehicle wireless device monitors whether there is a signal in the predetermined frequency band, and controls transmission and stoppage of the signal related to the vehicle, according to the presence of a signal in this frequency band. Accordingly, the in-vehicle communication apparatus is able to receive the signal transmitted from the in-vehicle wireless device in a situation where the possibility of crosstalk occurring is low.

(10) An in-vehicle communication apparatus according to one aspect of the present invention is an in-vehicle communication apparatus that communicates with a mobile device configured to wirelessly transmit a signal related to operation of a vehicle in a predetermined frequency band and an in-vehicle wireless device configured to wirelessly transmit a signal related to the vehicle in the predetermined frequency band, the in-vehicle communication apparatus including an in-vehicle receiving unit configured to receive the signals in the predetermined frequency band, a determination unit configured to determine whether there is crosstalk, based on the signals received with the in-vehicle receiving unit, and an in-vehicle transmitting unit configured to transmit, to the mobile device or the in-vehicle wireless device, a stop signal instructing to stop signal transmission, in a case where it is determined with the determination unit that crosstalk has occurred.

In the instant invention, similarly to the aspect (1), crosstalk does not occur, and the in-vehicle communication apparatus is able to receive the signal that is transmitted from the mobile device or the in-vehicle wireless device.

Specific examples of a vehicle communication system according to embodiments of the present invention will be described hereinafter, with reference to the drawings. Note that the present invention is not limited to these illustrative examples and is defined by the claims, and all changes that come within the meaning and range of equivalency of the claims are intended to be embraced therein.

First Embodiment

FIG. 1 is a schematic diagram showing one exemplary configuration of a vehicular communication system according to a first embodiment of the present invention. The vehicular communication system according to this first embodiment shares hardware related to wireless communication, and constitutes wireless communication systems consisting of a TPMS and a passive entry system. The vehicular communication system includes an in-vehicle communication apparatus 1 provided in a suitable part of a vehicle body, an in-vehicle wireless device 2 provided to each wheel of tires 3 attached to a vehicle C, a mobile device 4 related to the passive entry system, and a reporting apparatus 5 related to the TPMS.

The TPMS is constituted by the in-vehicle communication apparatus 1, the in-vehicle wireless devices 2 and the reporting apparatus 5. The in-vehicle wireless devices 2 periodically detect the air pressure of the tires 3 that are mounted on the wheels, and transmit the detected air pressure to the in-vehicle communication apparatus 1 by radio waves in the UHF (Ultra High Frequency) band. The in-vehicle communication apparatus 1 acquires information on the air pressure of each tire 3, by wirelessly communicating with each in-vehicle wireless device 2. The reporting apparatus 5 is connected to the in-vehicle communication apparatus 1 via a communication line, and the in-vehicle communication apparatus 1 transmits the acquired information on the air pressure to the reporting apparatus 5. The reporting apparatus 5 receives the information on the air pressure transmitted from the in-vehicle communication apparatus 1 and reports the air pressure. Also, the reporting apparatus 5 issues a warning, in the case where the air pressure of the tire 3 is less than a predetermined threshold value.

On the other hand, the passive entry system is constituted by the in-vehicle communication apparatus 1 and the mobile device 4. The in-vehicle communication apparatus 1 wirelessly communicates with a mobile device 4 that belongs to a user, authenticates the mobile device 4, and detects the position of the mobile device 4. A touch sensor which is not illustrated is provided in a door handle of the vehicle C, and when an authorized mobile device 4 is located outside the vehicle in the case where it is detected by the touch sensor that the user's hand has touched the door handle or in the case where a door switch is pressed, the in-vehicle communication apparatus 1 executes processing such as locking or unlocking the doors of the vehicle C.

Note that the passive entry system constituting the vehicular communication system is an example, and the present invention can be applied to a system that performs wireless communication between the mobile device 4 and the in-vehicle communication apparatus 1, and performs various types of vehicle control. For example, the vehicular communication system may constitute a system such as a smart start system that enables starting of a motor mounted in the vehicle without using a mechanical key or a keyless entry system, together with the TPMS.

FIG. 2 is a block diagram showing one exemplary configuration of the in-vehicle communication apparatus 1. The in-vehicle communication apparatus 1 includes a control unit 11 that controls the operations of each constituent element of the in-vehicle communication apparatus 1. A storage unit 12, an in-vehicle receiving unit 13, an in-vehicle transmitting unit 14, and a clocking unit 15 and an in-vehicle communication unit 16 are connected to the control unit 11.

The control unit 11 is a microcomputer having one or a plurality of CPUs (Central Processing Units), a multi-core CPU, a ROM (Read Only Memory), a RAM (Random Access Memory), an input-output interface and the like, for example. The CPU of the control unit 11 is connected to the storage unit 12, the in-vehicle receiving unit 13, the in-vehicle transmitting unit 14, the clocking unit 15 and the in-vehicle communication unit 16 via the input-output interface. The control unit 11, by executing a control program that is stored in the storage unit 12, controls the operations of each constituent element, and executes tire pressure monitoring processing, door locking and unlocking processing, and crosstalk prevention processing according to the present embodiment.

The storage unit 12 is a nonvolatile memory such as an EEPROM (Electrically Erasable Programmable ROM) or a flash memory. The storage unit 12 stores a control program for executing tire pressure monitoring processing, door locking and unlocking processing and crosstalk prevention processing according to the present embodiment, as a result of the control unit 11 controlling the operations of each constituent element of the in-vehicle communication apparatus 1.

An RF antenna 13a is connected to the in-vehicle receiving unit 13. The in-vehicle receiving unit 13 receives the signal that is transmitted using radio waves in the RF band from the in-vehicle wireless devices 2 or the mobile device 4 with the RF antenna 13a. The in-vehicle receiving unit 13 is a circuit that demodulates the received signal, and outputs the demodulated signal to the control unit 11. The UHF (Ultra High Frequency) band (300 MHz to 3 GHz) is used as the carrier wave, but the present invention is not limited to this frequency band.

The in-vehicle transmitting unit 14 is a circuit that modulates the signal output from the control unit 11 to a signal in the LF band, and transmits the modulated signal to the in-vehicle wireless devices 2 or the mobile device 4 from an LF antenna 14a. The LF (Low Frequency) band (30 kHz to 300 kHz) is used as the carrier wave, but the present invention is not limited to this frequency band.

The clocking unit 15 is constituted by a timer or a real-time clock, for example, and is configured to start clocking under the control of the control unit 11 and provide the clocking result to the control unit 11.

The in-vehicle communication unit 16 is a communication circuit that communicates in accordance with a communication protocol such as CAN (Controller Area Network) or LIN (Local Interconnect Network), and transmits information related to the air pressure of the tire 3 to the reporting apparatus 5.

The reporting apparatus 5 is, for example, an audio device equipped with a speaker or a display unit that reports, with audio or images, information related to the air pressure of the tires 3 transmitted from the in-vehicle communication unit 16 or a display unit provided in a meter of an instrument panel. The display unit is a liquid crystal display, an organic electroluminescent display, a head-up display or the like. For example, the reporting apparatus 5 displays the air pressure of each tire 3 provided in the vehicle C.

FIG. 3 is a block diagram showing one exemplary configuration of the in-vehicle wireless device 2. The in-vehicle wireless device 2 includes a sensor control unit 21 that controls the operations of each constituent element of the in-vehicle wireless device 2. A sensor storage unit 22, a sensor transmitting unit 23, a sensor receiving unit 24, an air pressure detection unit 25 and a clocking unit 26 are connected to the sensor control unit 21.

The sensor control unit 21 is a microcomputer having one or a plurality of CPUs, a multi-core CPU, a ROM, a RAM, an input-output interface and the like, for example. The CPU of the sensor control unit 21 is connected to the sensor storage unit 22, the sensor transmitting unit 23, the sensor receiving unit 24, the air pressure detection unit 25 and the clocking unit 26 via an input-output interface. The sensor control unit 21 reads out a control program that is stored in the sensor storage unit 22, and controls each constituent element. The in-vehicle wireless device 2 includes a battery which is not illustrated, and operates using power from the battery.

The sensor storage unit 22 is a nonvolatile memory. A control program for executing processing related to detection and transmission of the air pressure of the tire 3 that is performed by the CPU of the sensor control unit 21 is stored in the sensor storage unit 22.

The air pressure detection unit 25 includes a diaphragm, for example, and detects the air pressure of the tire 3, based on the amount of deformation of the diaphragm that changes with the magnitude of pressure. The air pressure is absolute pressure. Absolute pressure is the magnitude of pressure based on an absolute vacuum. Note that, in the present embodiment, the air pressure detection unit 25 is described as detecting absolute pressure, but may be configured to detect a differential pressure showing the magnitude of pressure relative to a gauge pressure or a predetermined reference pressure. The predetermined reference pressure is a median value, a lower limit value or an upper limit value of a range of air pressures over which the state of the tire 3 does not require inspection, for example.

The air pressure detection unit 25 outputs a signal indicating the detected air pressure of the tire 3 to the sensor control unit 21. The sensor control unit 21, by executing the control program, generates a signal including information such as the air pressure of the tire 3 and an apparatus ID unique to the in-vehicle wireless device 2, and outputs the generated signal to the sensor transmitting unit 23.

A RF antenna 23a is connected to the sensor transmitting unit 23. The sensor transmitting unit 23 modulates the signal generated by the sensor control unit 21 to a signal in the UHF band, and transmits the modulated signal using the RF antenna 23a.

An LF antenna 24a is connected to the sensor receiving unit 24. The sensor receiving unit 24 receives the signal transmitted from the in-vehicle communication apparatus 1 using radio waves in the LF band with LF antenna 24a, and outputs the received signal to the sensor control unit 21.

FIG. 4 is a block diagram showing one exemplary configuration of the mobile device 4. The mobile device 4 includes a mobile device control unit 41 that controls the operations of each constituent element of the mobile device 4. A mobile device storage unit 42, a mobile transmitting unit 43, a mobile receiving unit 44 and a signal strength measurement unit 45 are connected to the mobile device control unit 41.

The mobile device control unit 41 is a microcomputer having one or a plurality of CPUs, a multi-core CPU, a ROM, a RAM, an input-output interface and the like, for example. The CPU of the mobile device control unit 41 is connected to the mobile device storage unit 42, the mobile transmitting unit 43, the mobile receiving unit 44 and the signal strength measurement unit 45 via an input-output interface. The mobile device control unit 41 reads out a control program that is stored in the mobile device storage unit 42, and controls each constituent element.

The mobile device storage unit 42 is a nonvolatile memory. The mobile device storage unit 42 stores a control program for executing processing for transmitting a signal including the information for executing position detection of the mobile device 4 and the like to the in-vehicle communication apparatus 1, as a result of the mobile device control unit 41 controlling the operations of each constituent element of the mobile device 4.

The mobile receiving unit 44 is connected to an LF antenna 44a, and receives the various signals transmitted from the in-vehicle communication apparatus 1 using radio waves in the LF band, and outputs the received signals to the mobile device control unit 41.

A reception signal strength detection unit is a circuit that detects a reception signal strength of the signal received by the LF antenna 44a, and outputs the detected reception signal strength to the mobile device control unit 41.

The mobile transmitting unit 43 is connected to the RF antenna 43a, and modulates the signal output from the mobile device control unit 41 to a signal in the RF band, and transmits the modulated signal from the RF antenna 43a.

The mobile transmitting unit 43 transmits the signal using radio waves in the UHF band.

Next, a processing procedure related to crosstalk prevention of signals transmitted from the in-vehicle wireless device 2 and the mobile device 4 will be described. In the first embodiment, the in-vehicle wireless device 2 is given as independently transmitting a signal related to the air pressure of the tire 3 periodically at a predetermined transmission frequency.

FIG. 5 is a flowchart showing a processing procedure of the in-vehicle communication apparatus 1 according to the first embodiment. The in-vehicle communication apparatus 1 determines whether a signal was received with the in-vehicle receiving unit 13 (step S11). If it is determined that a signal has not been received (step S11: NO), the control unit 11 returns the processing to step S11, and monitors the signal reception state.

If it is determined that a signal has been received (step S11: YES), the control unit 11 starts reception processing (step S12), and determines whether crosstalk has occurred (step S13). The presence of crosstalk need only be determined based on whether meaningful information can be extracted from the received signal, for example. Crosstalk occurs in the case where signals are simultaneously transmitted from the in-vehicle wireless device 2 and the mobile device 4. If it is determined that crosstalk has occurred (step S13: YES), the control unit 11 transmits a stop signal instructing to stop signal transmission to the in-vehicle wireless device 2 with the in-vehicle transmitting unit 14 (step S14), and returns the processing to step S13. The in-vehicle wireless device 2, having received the stop signal, stops signal transmission as will be discussed later.

If it is determined that crosstalk has not occurred (step S13: NO), the control unit 11 executes reception processing of the signal transmitted from the mobile device 4 or the in-vehicle wireless device 2 (step S15). In particular, in the case where crosstalk has not occurred, reception processing of the signal transmitted from the in-vehicle wireless device 2 or the mobile device 4 is performed. In the case where the in-vehicle wireless device 2 stops signal transmission after crosstalk has occurred, the control unit 11 will receive the signal transmitted from the mobile device 4.

Next, the control unit 11 determines whether signal reception processing has been completed (step S16). If it is determined that reception of the signal from the mobile device 4 or the in-vehicle wireless device 2 has not been completed (step S16: NO), the control unit 11 returns the processing to step S13, and continues reception processing.

If it is determined that reception processing has been completed (step S16: YES), the control unit 11 determines whether processing for stopping transmission of the signal from the in-vehicle wireless device 2 is being executed (step S17). If it is determined that processing for stopping transmission of the signal from the in-vehicle wireless device 2 is not being executed (step S17: NO), the control unit 11 returns the processing to step S11. If it is determined that processing for stopping transmission of the signal from the in-vehicle wireless device 2 is being executed (step S17: YES), the control unit 11 transmits a stop signal instructing to cancel transmission stoppage processing to the in-vehicle wireless device 2 with the in-vehicle transmitting unit 14 (step S18), and returns the processing to step S11. The in-vehicle wireless device 2, having received the stoppage cancellation signal, resumes signal transmission as will be discussed later.

FIG. 6 is a flowchart showing a processing procedure of the in-vehicle wireless device 2 according to the first embodiment. The sensor control unit 21 of the in-vehicle wireless device 2 refers to the clocking result of the clocking unit 26, and determines whether the transmission timing of the signal indicating the air pressure of the tire 3 has arrived (step S31). The in-vehicle wireless device 2 transmits the signal related to the air pressure of the tire 3 to the in-vehicle communication apparatus 1, at a transmission frequency of once every 60 seconds, for example. If it is determined that the transmission timing has not arrived (step S31: NO), the sensor control unit 21 returns the processing to step S31, and waits until the transmission timing arrives.

If it is determined that the transmission timing has arrived (step S31: YES), the sensor control unit 21 detects the air pressure of the tire 3 with the air pressure detection unit 25 (step S32). Next, the sensor control unit 21 determines whether the stop signal has been received with the sensor receiving unit 24 (step S33). If it is determined that the stop signal has not been received (step S33: NO), the sensor control unit 21 transmits the signal indicating the detected air pressure to the in-vehicle communication apparatus 1 with the sensor transmitting unit 23 (step S34), and returns the processing to step S31.

If it is determined that the stop signal has been received (step S33: YES), the sensor control unit 21 thereafter determines whether the stoppage cancellation signal has been received (step S35). If it is determined that the stoppage cancellation signal has not been received (step S35: NO), the sensor control unit 21 returns the processing to step S35, and waits until the stoppage cancellation signal is received. In other words, processing for detecting the air pressure of the tire 3 and transmitting the signal indicating the detected air pressure is stopped. If the stoppage cancellation signal has been received (step S35: YES), the sensor control unit 21 returns the processing to step S31, and resumes processing for detecting the air pressure and transmitting the signal indicating the detected air pressure.

According to the vehicular communication system constituted in this way, in the case where signals are simultaneously transmitted from the in-vehicle wireless device 2 and the mobile device 4 and crosstalk occurs, the in-vehicle communication apparatus 1, by transmitting the stop signal to the in-vehicle wireless device 2, stops transmission of the signal from the in-vehicle wireless device 2 and enables a state in which crosstalk does not occur. The in-vehicle communication apparatus 1 is able to receive the signal transmitted from the mobile device 4, by temporarily stopping transmission of the signal from the in-vehicle wireless device 2. Accordingly, crosstalk between the signals that are transmitted from the in-vehicle wireless device 2 constituting the TPMS and the mobile device 4 constituting the passive entry system can be prevented, and the signal transmitted from the mobile device 4 can be received.

The in-vehicle communication apparatus 1 can then resume signal transmission by transmitting the cancellation signal to the in-vehicle wireless device 2, after completing reception of the signal from the mobile device 4. The in-vehicle communication apparatus 1 is able to receive the signal related to the air pressure of the tire 3 that is transmitted from the in-vehicle wireless device 2.

Second Embodiment

Since the configuration of the vehicular communication system according to a second embodiment is similar to the first embodiment, and the cancellation procedure of the signal stoppage processing differs from the first embodiment, the following description will focus on the differences.

Since the remaining configuration and the operation and effect are similar to the first embodiment, similar reference signs will be given to corresponding parts and a detailed description thereof will be omitted.

Although the in-vehicle communication apparatus 1 according to the first embodiment has a configuration for transmitting a stoppage cancellation signal to the in-vehicle wireless device 2 and resuming signal transmission, when reception processing of the signal from the mobile device 4 is completed after transmission of the stop signal, the in-vehicle wireless device 2 according to the second embodiment has a configuration for resuming signal transmission independently.

FIG. 7 is a flowchart showing a processing procedure of the in-vehicle wireless device 2 according to the second embodiment. The sensor control unit 21 of the in-vehicle wireless device 2 according to the second embodiment executes similar processing to steps S31 to S34 of the first embodiment at steps S231 to S234. In step S233, the sensor control unit 21 determines whether the stop signal has been received with the sensor receiving unit 24 (step S233). If it is determined that the stop signal has been received (step S233: YES), the sensor control unit 21 starts clocking with the clocking unit 26 (step S235). The sensor control unit 21 then determines whether a predetermined time period has elapsed after the start of clocking (step S236). If it is determined that the predetermined time period has not elapsed (step S236: NO), the sensor control unit 21 returns the processing to step S236, and waits until the predetermined time period elapses. If it is determined that the predetermined time period has elapsed (step S236: YES), the sensor control unit 21 returns the processing to step S231, and resumes processing for detecting the air pressure and transmitting the signal indicating the detected air pressure.

With the vehicular communication system according to the second embodiment, the in-vehicle communication apparatus 1, by transmitting the stop signal to the in-vehicle wireless device 2, is able to stop transmission of the signal from the in-vehicle wireless device 2, and to receive the signal from the mobile device 4 in a state where crosstalk does not occur. Thereafter, when the predetermined time period elapses, the in-vehicle wireless device 2 is able to independently resume signal transmission, and the in-vehicle communication apparatus 1 is able to receive the signal related to the air pressure of the tire 3 that is transmitted from the in-vehicle wireless device 2.

Accordingly, crosstalk between the signals that are transmitted from the in-vehicle wireless device 2 constituting the TPMS and the mobile device 4 constituting the passive entry system can be prevented. Also, transmission of the signal by the in-vehicle wireless device 2 can be resumed, even if the in-vehicle communication apparatus 1 does not transmit the cancellation signal.

Third Embodiment

Since the configuration of the vehicular communication system according to the third embodiment is similar to the first embodiment, and processing for discarding information received at the time of crosstalk occurring differs from the first embodiment, the following description will focus on the differences. Since the remaining configuration and the operation and effect are similar to the first embodiment, similar reference signs will be given to corresponding parts and a detailed description thereof will be omitted.

FIG. 8 is a flowchart showing a processing procedure of the in-vehicle communication apparatus 1 according to the third embodiment. The control unit 11 of the in-vehicle communication apparatus 1 according to the second embodiment executes similar processing to steps S11 to S14 of the first embodiment at steps S311 to S314. If it is determined that crosstalk has occurred (step S313: YES), the control unit 11 according to the third embodiment transmits a stop signal instructing to stop signal transmission to the in-vehicle wireless device 2 with the in-vehicle transmitting unit 14 (step S314), discards information obtained by performing reception processing at the time of crosstalk occurring (step S315), and returns the processing to step S313.

If it is determined that crosstalk has not occurred (step S313: NO), the control unit 11 executes similar processing to steps S15 to S18 of the first embodiment at steps S316 to S319.

With the vehicular communication system according to the third embodiment, the in-vehicle communication apparatus 1 deletes the information of a signal received by the in-vehicle receiving unit 13 when crosstalk has occurred, and is thus able to prevent receiving information that is erroneous due to crosstalk.

Note that although the third embodiment was described as a variation of the first embodiment, the vehicular communication system may also be constituted by combining the embodiments 2 and 3.

Fourth Embodiment

Since the configuration of the vehicular communication system according to a fourth embodiment is similar to the first embodiment, and differs from the first embodiment in that the in-vehicle wireless device 2 transmits the signal indicating the air pressure of the tire 3 in response to a request from the in-vehicle communication apparatus 1, the following description will focus on the differences. Since the remaining configuration and the operation and effect are similar to the first embodiment, similar reference signs will be given to corresponding parts and a detailed description thereof will be omitted.

FIG. 9 is a flowchart showing a processing procedure of the in-vehicle communication apparatus 1 according to the fourth embodiment. The control unit 11 of the in-vehicle communication apparatus 1 refers to the clocking result of the clocking unit 15, and determines whether the transmission timing of the signal indicating the air pressure of the tire 3 has arrived (step S411). If it is determined that the transmission timing has not arrived (step S411: NO), the control unit 11 returns the processing to step S411, and waits until the transmission timing arrives.

If it is determined that the transmission timing has arrived (step S411: YES), the control unit 11 transmits a request signal requesting transmission of the signal indicating the air pressure of the tire 3 to the in-vehicle wireless device 2 with the in-vehicle transmitting unit 14 (step S412). The request signal will be transmitted from the in-vehicle communication apparatus 1 to the in-vehicle wireless device 2 at a predetermined transmission frequency as a result of the processing of steps S411 and S412.

Next, the control unit 11 determines whether a signal has been received with the in-vehicle receiving unit 13 (step S413). If it is determined that a signal has not been received (step S413: NO), the control unit 11 returns the processing to step S413, and monitors the signal reception state.

If it is determined that a signal has been received (step S413: YES), the control unit 11 starts reception processing (step S414), and determines whether crosstalk has occurred (step S415). If it is determined that crosstalk has occurred (step S415: YES), the control unit 11 transmits a stop signal instructing to stop signal transmission to the in-vehicle wireless device 2 with the in-vehicle transmitting unit 14 (step S416), returns the processing to step S415, and continues reception processing.

If it is determined that crosstalk has not occurred (step S415: NO), the control unit 11 executes reception processing of the signal transmitted from the mobile device 4 or the in-vehicle wireless device 2 (step S417). Next, the control unit 11 determines whether signal reception processing has been completed (step S418). If it is determined that reception of the signal from the mobile device 4 or the in-vehicle wireless device 2 has not been completed (step S418: NO), the control unit 11 returns the processing to step S415. If it is determined that reception processing has been completed (step S418: YES), the control unit 11 returns the processing to step S411.

FIG. 10 is a flowchart showing a processing procedure of the in-vehicle wireless device 2 according to the fourth embodiment. The sensor control unit 21 of the in-vehicle wireless device 2 determines whether a request signal transmitted from the in-vehicle communication apparatus 1 has been received (step S431). If it is determined that the request signal has not been received (step S431: NO), the sensor control unit 21 returns the processing to step S431, and waits until the request signal is received.

If it is determined that the request signal has been received (step S431: YES), the sensor control unit 21 detects the air pressure of the tire 3 with the air pressure detection unit 25 (step S432). Next, the sensor control unit 21 determines whether the stop signal has been received with the sensor receiving unit 24 (step S433). If it is determined that the stop signal has not been received (step S433: NO), the sensor control unit 21 transmits the signal indicating the detected air pressure to the in-vehicle communication apparatus 1 with the sensor transmitting unit 23 (step S434), and returns the processing to step S431.

If it is determined that the stop signal has been received (step S433: YES), the signal indicating the air pressure is not transmitted, and the sensor control unit 21 returns the processing to step S431. The signal indicating the air pressure of the tire 3 is not transmitted from the in-vehicle wireless device 2 until the request signal is next transmitted from the in-vehicle communication apparatus 1.

With the vehicular communication system according to the fourth embodiment constituted in this way, in response to the request from the in-vehicle communication apparatus 1, the in-vehicle wireless device 2 transmits a signal related to the air pressure of the tire 3, and the in-vehicle communication apparatus 1 receives this signal. The in-vehicle communication apparatus 1, despite having requested signal transmission from the in-vehicle wireless device 2, stops transmission of the signal from the in-vehicle wireless device 2 by transmitting the stop signal to the in-vehicle wireless device 2 immediately, in the case where there is a risk that crosstalk may occur due to the signal from the mobile device 4. The in-vehicle communication apparatus 1 is then able to receive the signal from the mobile device 4, in a state where crosstalk does not occur.

Accordingly, crosstalk between the signals that are transmitted from the in-vehicle wireless device 2 constituting the TPMS and the mobile device 4 constituting the passive entry system can be prevented.

Note that although the fourth embodiment was described as a variation of the first embodiment, the vehicular communication system may also be constituted by combining the embodiments 3 and 4.

Fifth Embodiment

Since the configuration of the vehicular communication system according to a fifth embodiment is similar to the first embodiment, and the contents of processing at the time of crosstalk that depends on the speed of the vehicle C differ from the first embodiment, the following description will focus on the differences. Since the remaining configuration and the operation and effect are similar to the first embodiment, similar reference signs will be given to corresponding parts and a detailed description thereof will be omitted.

FIG. 11 is a block diagram showing one exemplary configuration of an in-vehicle communication apparatus 501 according to the fifth embodiment. The in-vehicle communication apparatus 501 according to the fifth embodiment, similarly to the first embodiment, includes a control unit 11, a storage unit 12, an in-vehicle transmitting unit 14, an in-vehicle receiving unit 13, a clocking unit 15 and an in-vehicle communication unit 16. A vehicle speed detection unit 6 is connected to the in-vehicle communication unit 16, in addition to a reporting apparatus 5.

The vehicle speed detection unit 6 includes, for example, a non-contact sensor equipped with a magnetic pickup, a Hall element or the like configured to send a signal proportional to the number of rotations of an axle with which the vehicle C is equipped, and a counting circuit configured to count the number of pulses from the non-contact sensor, and detects the speed of the vehicle C by counting the number of pulses. The vehicle speed detection unit 6 outputs vehicle speed information indicting the speed of the vehicle C to the in-vehicle communication unit 16, and the control unit 11 acquires the vehicle speed information with the vehicle speed detection unit 6.

The non-contact sensor is an example of a speed detection unit, and is not limited to the structure described above. For example, the vehicle speed detection unit 6 may be constituted so as to detect the speed of the vehicle C, based on position information on the vehicle C detected with GPS.

FIG. 12 and FIG. 13 are flowcharts showing a processing procedure of the in-vehicle communication apparatus 501 according to the fifth embodiment. In the fifth embodiment, an in-vehicle wireless device 2 independently transmits a signal related to the air pressure of the tire 3 periodically at a predetermined transmission frequency, and is configured to change the transmission frequency of the signal, as a result of an instruction from the in-vehicle communication apparatus 501.

The in-vehicle communication apparatus 501 determines whether a signal has been received with the in-vehicle receiving unit 13 (step S511). If it is determined that a signal has not been received (step S511: NO), the control unit 11 returns the processing to step S511, and monitors the signal reception state. If it is determined that a signal has been received (step S511: YES), the control unit 11 starts reception processing (step S512), and determines whether crosstalk has occurred (step S513). If it is determined that crosstalk has occurred (step S513: YES), the control unit 11 detects the vehicle speed with the vehicle speed detection unit 6 (step S514) and determines whether the detected vehicle speed is greater than or equal to a predetermined speed (step S515).

If it is determined that the vehicle speed is greater than or equal to the predetermined speed (step S515: YES), the control unit 11 transmits an increase instruction signal for increasing the transmission frequency of the signal indicating the air pressure of the tire 3 to the in-vehicle wireless device 2 with the in-vehicle transmitting unit 14 (step S516), and returns the processing to step S513.

If it is determined that the vehicle speed is less than the predetermined speed (step S515: NO), the control unit 11 transmits the stop signal to the in-vehicle wireless device 2 with the in-vehicle transmitting unit 14 (step S517), and returns the processing to step S513.

If it is determined that crosstalk has not occurred (step S513: NO), the control unit 11 executes reception processing of the signal transmitted from the mobile device 4 or the in-vehicle wireless device 2 (step S518). Next, the control unit 11 determines whether signal reception processing has been completed (step S519). If it is determined that reception of the signal from the mobile device 4 or the in-vehicle wireless device 2 has not been completed (step S519: NO), the control unit 11 returns the processing to step S513, and continues reception processing.

If it is determined that reception processing has been completed (step S519: YES), the control unit 11 determines whether processing for stopping transmission of the signal from the in-vehicle wireless device 2 is being executed (step S520). If it is determined that processing for stopping transmission of the signal from the in-vehicle wireless device 2 is being executed (step S520: YES), the control unit 11 transmits a stoppage cancellation signal instructing to cancel transmission stoppage processing to the in-vehicle wireless device 2 with the in-vehicle transmitting unit 14 (step S521).

If the processing of step S521 has ended or if it is determined that processing for stopping transmission of the signal from the in-vehicle wireless device 2 is not being executed (step S520: NO), the control unit 11 determines whether processing for causing the signal indicating the air pressure of the tire 3 to be transmitted at a high frequency is being executed (step S522). If it is determined that processing for transmitting the signal indicating the air pressure of the tire 3 at a high frequency is not being executed (step S522: NO), the control unit 11 returns the processing to step S511. If it is determined that processing for causing the signal indicating the air pressure of the tire 3 to be transmitted at a high frequency is being executed (step S522: YES), the control unit 11 detects the vehicle speed with the vehicle speed detection unit 6 (step S523), and determines whether the vehicle speed is less than the predetermined speed (step S524). If it is determined that the vehicle speed is greater than or equal to the predetermined speed (step S524: NO), the control unit 11 returns the processing to step S511. If it is determined that the vehicle speed is less than the predetermined speed (step S524: YES), the control unit 11 transmits an increase instruction cancellation signal indicating to cancel processing for causing the signal indicating the air pressure of the tire 3 to be transmitted at a high frequency to the in-vehicle wireless device 2 with the in-vehicle transmitting unit 14 (step S525), and returns the processing to step S511.

FIG. 14 is a flowchart showing a processing procedure of the in-vehicle wireless device 2 according to the fifth embodiment. The sensor control unit 21 of the in-vehicle wireless device 2 determines whether the increase instruction signal of the transmission frequency has been received with the sensor receiving unit 24 (step S531). If it is determined that the increase instruction signal has been received (step S531: YES), the sensor control unit 21 increases the transmission frequency of the signal indicating the air pressure of the tire 3 (step S532).

If the processing of step S532 has ended, of if it is determined that the increase instruction signal has not been received (step S531: NO), the sensor control unit 21 determines whether the increase instruction cancellation signal has been received (step S533). If it is determined that the increase instruction cancellation signal has been received (step S533: YES), the sensor control unit 21 returns the transmission frequency of the signal indicating the air pressure of the tire 3 to the predetermined transmission frequency before the increase (step S534).

If the processing of step S534 has ended, or if it is determined that the increase instruction cancellation signal has not been received (step S533: NO), the sensor control unit 21 executes similar processing to steps S31 to S35 in the first embodiment at steps S535 to S539.

With the vehicular communication system according to the fourth embodiment constituted in this way, in the case where crosstalk occurs when the speed of the vehicle C is greater than or equal to the predetermined speed, the in-vehicle communication apparatus 501, by causing the signal related to the air pressure of the tire 3 to be transmitted at a higher frequency, is able to increase the reception success probability of this signal. When the signal related to the air pressure of the tire 3 is more important than the signal from the mobile device 4, in the case where the speed of the vehicle C is greater than or equal to the predetermined speed, the in-vehicle communication apparatus 501 is able to more reliably acquire information on the air pressure of the tire 3.

In the case where crosstalk occurs when the speed of the vehicle C is less than the predetermined speed, similarly to the first embodiment, the in-vehicle communication apparatus 501, by transmitting the stop signal to the in-vehicle wireless device 2, is able to stop transmission of the signal from the in-vehicle wireless device 2, and to receive the signal transmitted from the mobile device 4 in a state where crosstalk does not occur.

Since the importance of the air pressure of the tire 3 is low when the speed of the vehicle C is less than the predetermined speed, the in-vehicle communication apparatus 501 is able to preferentially receive the signal from the mobile device 4, and to thereafter receive the signal from the in-vehicle wireless device 2.

In this way, together with preventing crosstalk between the signals that are transmitted from the in-vehicle wireless device 2 constituting the TPMS and the mobile device 4 constituting the passive entry system, the in-vehicle communication apparatus 501 is able to preferentially receive the signal having important information.

Note that although the fifth embodiment was described as a variation of the first embodiment, the vehicular communication system may be constituted combining the embodiments 2 and 5, or the vehicular communication system may be constituted combining the embodiments 3 and 5.

Sixth Embodiment

Since the configuration of the vehicular communication system according to a sixth embodiment is similar to the fourth embodiment, and the contents of processing at the time of crosstalk that depends on the speed of the vehicle C differ from the fourth embodiment, the following description will focus on the differences. Since the remaining configuration and the operation and effect are similar to the fourth embodiment, similar reference signs will be given to corresponding parts and a detailed description thereof will be omitted.

With the vehicular communication system according to the sixth embodiment, similarly to the fourth embodiment, the in-vehicle communication apparatus 1 controls the detection and transmission timing of the air pressure of the tire 3, and the contents of processing at the time of crosstalk occurring are similar to the fifth embodiment.

FIG. 15 and FIG. 16 are flowcharts showing a processing procedure of the in-vehicle communication apparatus 1 according to the sixth embodiment. The control unit 11 of the in-vehicle communication apparatus 1 executes similar processing to steps S411 to S415 in the fourth embodiment at steps S611 to S615. In step S615, in the case where it is determined that crosstalk has occurred (step S615: YES), the control unit 11 detects the vehicle speed with the vehicle speed detection unit 6 (step S616), and determines whether the vehicle speed is greater than or equal to a predetermined speed (step S617). If it is determined that the vehicle speed is greater than or equal to the predetermined speed (step S617: YES), the control unit 11 increases the transmission frequency of the request signal according to the vehicle speed (step S618), and returns the processing to step S615. Usually, the in-vehicle communication apparatus 1 transmits the request signal to the in-vehicle wireless device 2 at a predetermined transmission frequency, but the transmission frequency of the request signal increases as a result of the processing of step S618. The reception success probability of the signal indicating the air pressure of the tire 3 thus increases.

If it is determined that the vehicle speed is less than the predetermined speed (step S617: NO), the control unit 11 transmits the stop signal to the in-vehicle wireless device 2 with the in-vehicle transmitting unit 14 (step S619), returns the processing to step S615, and continues reception processing.

In step S615, in the case where it is determined that crosstalk has not occurred (step S615: NO), the control unit 11 executes reception processing of the signal transmitted from the mobile device 4 or the in-vehicle wireless device 2 (step S620). Next, the control unit 11 determines whether signal reception processing has been completed (step S621). If it is determined that reception of the signal from the mobile device 4 or the in-vehicle wireless device 2 has not been completed (step S621: NO), the control unit 11 returns the processing to step S615.

If it is determined that reception processing has been completed (step S621: YES), the control unit 11 determines whether processing for transmitting the request signal at a high frequency is being executed (step S622). If it is determined that processing for transmitting the request signal at a high frequency is not being executed (step S622: NO), the control unit 11 returns the processing to step S611. If it is determined that processing for transmitting the request signal at a high frequency is being executed (step S622: YES), the control unit 11 detects the vehicle speed with the vehicle speed detection unit 6 (step S623), and determines whether the vehicle speed is less than the predetermined speed (step S624).

If it is determined that the vehicle speed is greater than or equal to the predetermined speed (step S624: NO), the control unit 11 returns the processing to step S611. If it is determined that the vehicle speed is less than the predetermined speed (step S624: YES), the control unit 11 returns the transmission frequency of the request signal to the predetermined transmission frequency before the increase (step S625), and returns the processing to step S611.

With the vehicular communication system according to the sixth embodiment, in the case where crosstalk occurs when the speed of the vehicle C is greater than or equal to the predetermined speed, the in-vehicle communication apparatus 1, by transmitting the request signal to the in-vehicle wireless device 2 at a higher frequency, is able to cause the signal related to the air pressure of the tire 3 to be transmitted at a higher frequency, and to increase the reception success probability of this signal. When the signal related to the air pressure of the tire 3 is more important than the signal from the mobile device 4, in the case where the speed of the vehicle C is greater than or equal to the predetermined speed, the in-vehicle communication apparatus 1 is able to more reliably acquire information on the air pressure of the tire 3.

Despite having requested signal transmission from the in-vehicle wireless device 2, in the case where crosstalk occurs when the speed of the vehicle C is less than the predetermined speed, similarly to the fourth embodiment, the in-vehicle communication apparatus 1 stops transmission of the signal from the in-vehicle wireless device 2 by transmitting the stop signal to the in-vehicle wireless device 2 immediately. The in-vehicle communication apparatus 1 is then able to receive the signal from the mobile device 4, in a state where crosstalk does not occur.

In this way, together with preventing crosstalk between the signals that are transmitted from the in-vehicle wireless device 2 constituting the TPMS and the mobile device 4 constituting the passive entry system, the in-vehicle communication apparatus 1 is able to preferentially receive the signal having important information.

Note that although the sixth embodiment was described as a variation of the fourth embodiment, the vehicular communication system may also be constituted by combining the embodiments 3 and 6.

Seventh Embodiment

Since the configuration of the vehicular communication system according to a seventh embodiment is similar to the first embodiment, and the configuration and the processing procedure of the in-vehicle wireless device 2 differ from the first embodiment, the following description will focus on the differences. Since the remaining configuration and the operation and effect are similar to the first embodiment, similar reference signs will be given to corresponding parts and a detailed description thereof will be omitted.

FIG. 17 is a block diagram showing one exemplary configuration of an in-vehicle wireless device 2 according to the seventh embodiment. The in-vehicle wireless device 2 according to the seventh embodiment, similarly to the first embodiment, includes a sensor control unit 21, a sensor storage unit 22, a sensor transmitting unit 23, a sensor receiving unit 24, an air pressure detection unit 25, and a clocking unit 26. Furthermore, the in-vehicle wireless device 2 includes a switching unit 27 that switches the antenna that receives signals between a RF antenna 23a and a LF antenna 24a. The switching of the receiving antenna by the switching unit 27 is controlled by the sensor control unit 21. The in-vehicle wireless device 2 usually transmits signals using the RF antenna 23a and receives signals using the LF antenna 24a, but is able to switch the receiving antenna to the RF antenna 23a using the switching unit 27. By switching the receiving antenna to the RF antenna 23a, the in-vehicle wireless device 2 is able to receive signals in the UHF band that propagate in a vicinity of the vehicle C.

FIG. 18 is a flowchart showing a processing procedure of the in-vehicle wireless device 2 according to the seventh embodiment. The sensor control unit 21 of the in-vehicle wireless device 2 refers to the clocking result of the clocking unit 26, and determines whether the transmission timing of the signal indicating the air pressure of the tire 3 has arrived (step S731). If it is determined that the transmission timing has not arrived (step S731: NO), the sensor control unit 21 returns the processing to step S731, and waits until the transmission timing arrives.

If it is determined that the transmission timing has arrived (step S731: YES), the sensor control unit 21 switches the antenna that is used for signal reception to the RF antenna 23a (step S732), and receives signals using the RF antenna 23a (step S733). By switching the receiving antenna to the RF antenna 23a, the presence of a signal in the UHF band, such as a signal that is transmitted from the mobile device 4, for example, can be confirmed. The antenna that is used for signal reception is then switched to the original LF antenna 24a (step S734).

Next, the sensor control unit 21 determines, based on the reception result of step S733, whether there is a possibility of crosstalk between the signal that is transmitted from the in-vehicle wireless device 2 and the signal that is transmitted from the mobile device 4 (step S735). The sensor control unit 21 need only determine that there is a possibility of crosstalk, in the case where any signal is received in the processing of step S733. If it is determined that there is a possibility of crosstalk (step S735: YES), the sensor control unit 21 returns the processing to step S731.

If it is determined that there is no possibility of crosstalk (step S735: NO), the sensor control unit 21 executes similar processing to steps S32 to S35 in the first embodiment in the following steps S736 to 739.

With the vehicular communication system according to the seventh embodiment constituted in this way, the in-vehicle wireless device 2 monitors signals in the UHF band, and transmits the signal related to the air pressure of the tire 3 when there is no signal in the UHF band and stops signal transmission in the case where there is a signal in the UHF band. Accordingly, the in-vehicle communication apparatus 701 is able to receive the signal that is transmitted from the in-vehicle wireless device 2 in a situation where the possibility of crosstalk occurring is low. Therefore, crosstalk between the signals that are transmitted from the in-vehicle wireless device 2 constituting the TPMS and the mobile device 4 constituting the passive entry system can be more effectively prevented, and the signals transmitted from the in-vehicle wireless device 2 and the mobile device 4 can be received.

Note that although the seventh embodiment was described as a variation of the first embodiment, the vehicular communication system may be constituted by combining the configuration of the in-vehicle wireless device 2 according to the seventh embodiment with the first to sixth embodiments.

Eighth Embodiment

Since the configuration of the vehicular communication system according to an eighth embodiment is similar to the fourth embodiment, and differs from the fourth embodiment in that a second in-vehicle wireless device 7 that is connected by cable is included, the following description will focus on the differences. Since the remaining configuration and the operation and effect are similar to the fourth embodiment, similar reference signs will be given to corresponding parts and a detailed description thereof will be omitted.

FIG. 19 is a block diagram showing one exemplary configuration of an in-vehicle communication apparatus 801 according to the eighth embodiment. The in-vehicle communication apparatus 801 according to the eighth embodiment has a similar configuration to the first embodiment, and further includes a drive unit 17. The second in-vehicle wireless device 7 is connected to the drive unit 17. The control unit 11 transmits the request signal by cable to the second in-vehicle wireless device 7 with the drive unit 17. The second in-vehicle wireless device 7, in the case where the request signal is received, wirelessly transmits a signal in response to the request signal to the in-vehicle receiving unit 13 in the UHF band.

Similar operation and effect to the fourth embodiment can also be achieved with the vehicular communication system according to the eighth embodiment constituted in this way, and crosstalk between the signals that are transmitted from the in-vehicle wireless device 2 constituting the TPMS and the mobile device 4 constituting the passive entry system can be prevented.

Note that although the eighth embodiment was described as a variation of the fourth embodiment, the vehicular communication system may be constituted by combining the configuration of the in-vehicle communication apparatus 801 according to this eighth embodiment with the other embodiments.

Also, in the first to eighth embodiments, a configuration was described in which the in-vehicle communication apparatus 801 stops transmission of the signal by the in-vehicle wireless device 2 in the case where crosstalk occurs, but a configuration may be adopted in which signal transmission by the mobile device 4 is stopped. In this case, a configuration need only be adopted in which the mobile device 4 performs the signal transmission stoppage processing and cancellation processing executed by the in-vehicle wireless device 2 according to the first to eighth embodiments.

The invention claimed is:

1. A vehicular communication system comprising a mobile device configured to wirelessly transmit a signal related to operation of a vehicle in a predetermined frequency band, an in-vehicle transceiver configured to wirelessly transmit a signal related to the vehicle in the predetermined frequency band to a vehicle subsystem, and an in-vehicle communication apparatus provided in a different part from the in-vehicle transceiver and configured to wirelessly communicate with the mobile device and the in-vehicle transceiver, the in-vehicle communication apparatus including:
an in-vehicle receiving unit configured to receive the signals transmitted from the mobile device and the in-vehicle transceiver;
a determination unit configured to determine whether there is crosstalk, based on the signals received with the in-vehicle receiving unit; and
an in-vehicle transmitting unit configured to transmit, to the mobile device or the in-vehicle transceiver, a stop signal instructing to stop signal transmission, in a case where it is determined with the determination unit that crosstalk has occurred, and
the mobile device or the in-vehicle transceiver stopping signal transmission, in a case where the stop signal is received, and
the in-vehicle transmitting unit transmitting the stop signal to the in-vehicle transceiver before the signal is transmitted from the in-vehicle transceiver, in a case where the in-vehicle receiving unit receives the signal transmitted from the mobile device after transmitting, to the in-vehicle transceiver, a request signal requesting signal transmission.

2. The vehicular communication system according to claim 1, wherein the in-vehicle transmitting unit transmits, to the mobile device or the in-vehicle transceiver, a stoppage cancellation signal instructing to cancel transmission stoppage, and the mobile device or the in-vehicle transceiver resumes signal transmission, in a case where the stoppage cancellation signal is received.

3. The vehicular communication system according to claim 1, wherein the mobile device or the in-vehicle transceiver includes a clocking unit configured to clock an elapsed time period from when the stop signal was received, and resumes signal transmission in a case where a predetermined time period elapses from when the stop signal was received.

4. The vehicular communication system according to claim 1, wherein the in-vehicle communication apparatus deletes information of the signal received with the in-vehicle receiving unit, in a case where it is determined with the determination unit that crosstalk has occurred.

5. The vehicular communication system according to claim 1, comprising:

an air pressure detection unit configured to detect an air pressure of a tire of the vehicle, wherein the in-vehicle transceiver transmits a signal related to the air pressure detected with the air pressure detection unit.

6. The vehicular communication system according to claim 5, comprising:

a vehicle speed detection unit configured to detect a speed of the vehicle, wherein the in-vehicle transmitting unit intermittently transmits, to the in-vehicle transceiver, a request signal requesting signal transmission, and, in a case where the speed detected with the vehicle speed detection unit is greater than or equal to a predetermined speed and it is determined with the determination unit that crosstalk has occurred, increases a transmission frequency of the request signal.

7. The vehicular communication system according to claim 5, comprising:

a vehicle speed detection unit configured to detect a speed of the vehicle, wherein the in-vehicle transmitting unit transmits a predetermined instruction signal to the in-vehicle transceiver, in a case where the speed detected with the vehicle speed detection unit is greater than or equal to a predetermined speed and it is determined with the determination unit that crosstalk has occurred, and the in-vehicle transceiver intermittently transmits the signal related to the vehicle, and, in a case where the in-vehicle receiving unit receives the instruction signal, increases a transmission frequency of the signal related to the vehicle.

8. The vehicular communication system according to claim 1, wherein the in-vehicle transceiver includes a monitoring unit configured to monitor whether there is a signal in the predetermined frequency band that is transmitted from outside, and, in a case where there is not a signal in the predetermined frequency band, transmits the signal related to the vehicle, and, in a case where there is a signal in the predetermined frequency band, stops transmission of the signal related to the vehicle.

9. An in-vehicle communication apparatus that communicates with a mobile device configured to wirelessly transmit a signal related to operation of a vehicle in a predetermined frequency band and an in-vehicle transceiver configured to wirelessly transmit a signal related to the vehicle in the predetermined frequency band, comprising:

an in-vehicle receiving unit configured to receive the signals in the predetermined frequency band;

a determination unit configured to determine whether there is crosstalk, based on the signals received with the in-vehicle receiving unit; and an in-vehicle transmitting unit configured to transmit, to the mobile device or the in-vehicle transceiver, a stop signal instructing to stop signal transmission, in a case where it is determined with the determination unit that crosstalk has occurred, wherein the in-vehicle transmitting unit transmits the stop signal to the in-vehicle transceiver before the signal is transmitted from the in-vehicle transceiver, in a case where the in-vehicle receiving unit receives the signal transmitted from the mobile device after transmitting, to the in-vehicle transceiver, a request signal requesting signal transmission.

* * * * *